@(12) United States Patent
Shinohara et al.

(10) Patent No.: US 10,739,614 B2
(45) Date of Patent: Aug. 11, 2020

(54) OPTICAL DEVICE

(71) Applicant: OMRON Corporation, Kyoto (JP)

(72) Inventors: Masayuki Shinohara, Kyoto (JP);
Yasuhiro Tanoue, Shiga (JP);
Norikazu Kitamura, Osaka (JP);
Kazuyuki Okada, Shiga (JP); Tadashi
Matsuoka, Osaka (JP)

(73) Assignee: Omron Corporation, Kyoto (JP)

( * ) Notice: Subject to any disclaimer, the term of this
patent is extended or adjusted under 35
U.S.C. 154(b) by 156 days.

(21) Appl. No.: 15/808,677

(22) Filed: Nov. 9, 2017

(65) Prior Publication Data
US 2018/0129061 A1 May 10, 2018

Related U.S. Application Data

(63) Continuation of application No. PCT/JP2016/057211, filed on Mar. 8, 2016.

(30) Foreign Application Priority Data

Jul. 29, 2015 (JP) ................................. 2015-150034

(51) Int. Cl.
G02B 6/10 (2006.01)
G02B 30/60 (2020.01)
(Continued)

(52) U.S. Cl.
CPC ........... G02B 30/60 (2020.01); G02B 6/0023 (2013.01); G02B 6/0031 (2013.01); G02B 6/122 (2013.01);
(Continued)

(58) Field of Classification Search
CPC .. G02B 6/0013; G02B 6/0023; G02B 6/0031; G02B 6/105; G02B 6/0048; G02B 6/002; G02B 6/0018
(Continued)

(56) References Cited

U.S. PATENT DOCUMENTS 6,144,480 A 11/2000 Li et al.
6,839,102 B2* 1/2005 Endo ................... G02B 6/0018
349/61
(Continued)

FOREIGN PATENT DOCUMENTS

CN 102207576 A 10/2011
CN 103727452 A 4/2014
(Continued)

OTHER PUBLICATIONS

International Search Report issued in corresponding Application No. PCT/JP2016/057211, dated Apr. 12, 2016 (2 pages).
(Continued)

Primary Examiner — Audrey Y Chang
(74) Attorney, Agent, or Firm — Osha Liang LLP

(57) ABSTRACT

An optical device has a light guide plate that guides light in a plane parallel to an emission surface thereof, an optical deflection surface that deflects light entering the light guide plate from a light source that faces a plane parallel to at least the emission surface or the surface opposite the emission surface, so that the light travels along the light guide direction of the light guide plate, and a plurality of light focusing portions. Each of the light focusing portions includes an optical surface whereon the light deflected by the optical deflection surface and guided by the light guide plate is incident, and which causes the emission surface to output emission light that converges substantially on a convergence point or convergence line in a space, or that radiates substantially from a convergence point or convergence line in a space.

16 Claims, 23 Drawing Sheets

(51) Int. Cl.
*G03B 35/24* (2006.01)
*G02B 6/122* (2006.01)
*F21V 8/00* (2006.01)
*G02B 30/26* (2020.01)
*G02B 30/27* (2020.01)

(52) U.S. Cl.
CPC ............. *G02B 30/26* (2020.01); *G03B 35/24* (2013.01); *G02B 30/27* (2020.01)

(58) Field of Classification Search
USPC ........ 359/36, 39, 146, 11, 34, 633; 362/606, 362/615; 385/36, 39, 146, 11
See application file for complete search history.

(56) References Cited

U.S. PATENT DOCUMENTS

| 7,181,108 | B2* | 2/2007 | Levola ................... G02B 6/105 385/11 |
| 7,513,670 | B2* | 4/2009 | Yang ...................... G02B 6/002 362/606 |
| 8,743,464 | B1* | 6/2014 | Amirparviz ............ G02B 27/01 359/633 |
| 9,519,153 | B2* | 12/2016 | Robinson ............. G02B 6/0048 |
| 2006/0083476 | A1* | 4/2006 | Winkler ............... G02B 6/0018 385/146 |
| 2011/0242441 | A1 | 10/2011 | Minami |
| 2012/0092766 | A1 | 4/2012 | Maekawa et al. |
| 2014/0268327 | A1* | 9/2014 | Dunn ....................... G02B 5/09 359/466 |
| 2014/0368907 | A1 | 12/2014 | Minami |
| 2016/0132185 | A1 | 5/2016 | Otsubo |

FOREIGN PATENT DOCUMENTS

| JP | 2000510603 A | 8/2000 |
| JP | 2008275922 A | 11/2008 |
| JP | 2009540440 A | 11/2009 |
| JP | 2010262228 A | 11/2010 |
| JP | 2012-008464 A | 1/2012 |
| JP | 5509391 B1 | 6/2014 |
| WO | 2013/188464 A1 | 12/2013 |

OTHER PUBLICATIONS

Written Opinion issued in corresponding Application No. PCT/JP2016/057211, dated Apr. 12, 2016 (4 pages).

Office Action issued in Chinese Application No. 201680022569.5; dated Jun. 25, 2019 (9 pages).

* cited by examiner

FIG. 3
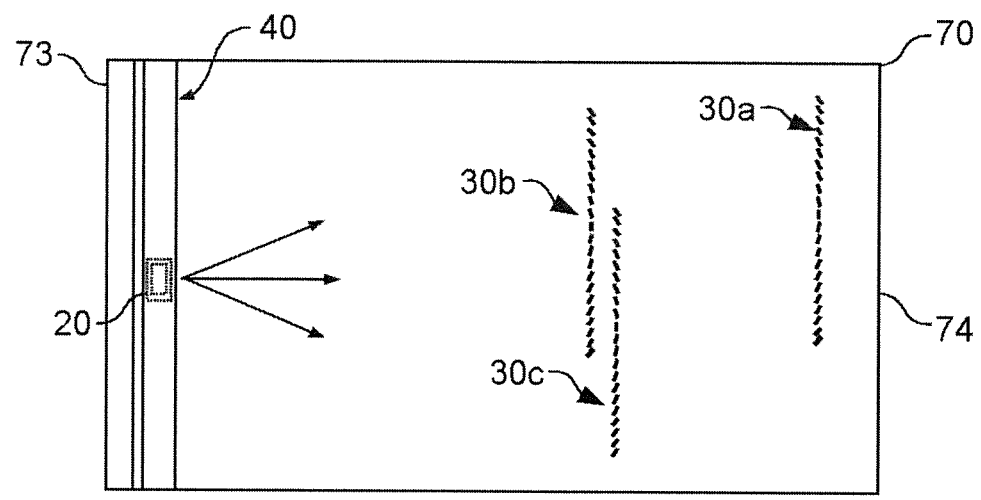
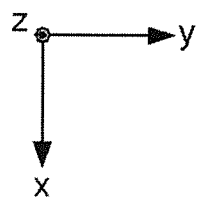

FIG. 7
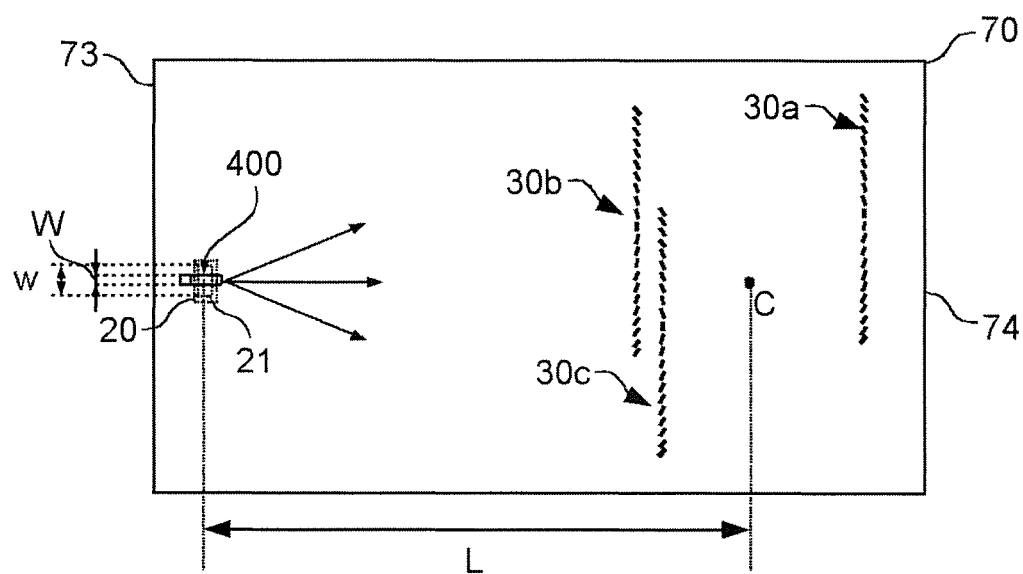
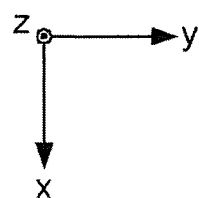

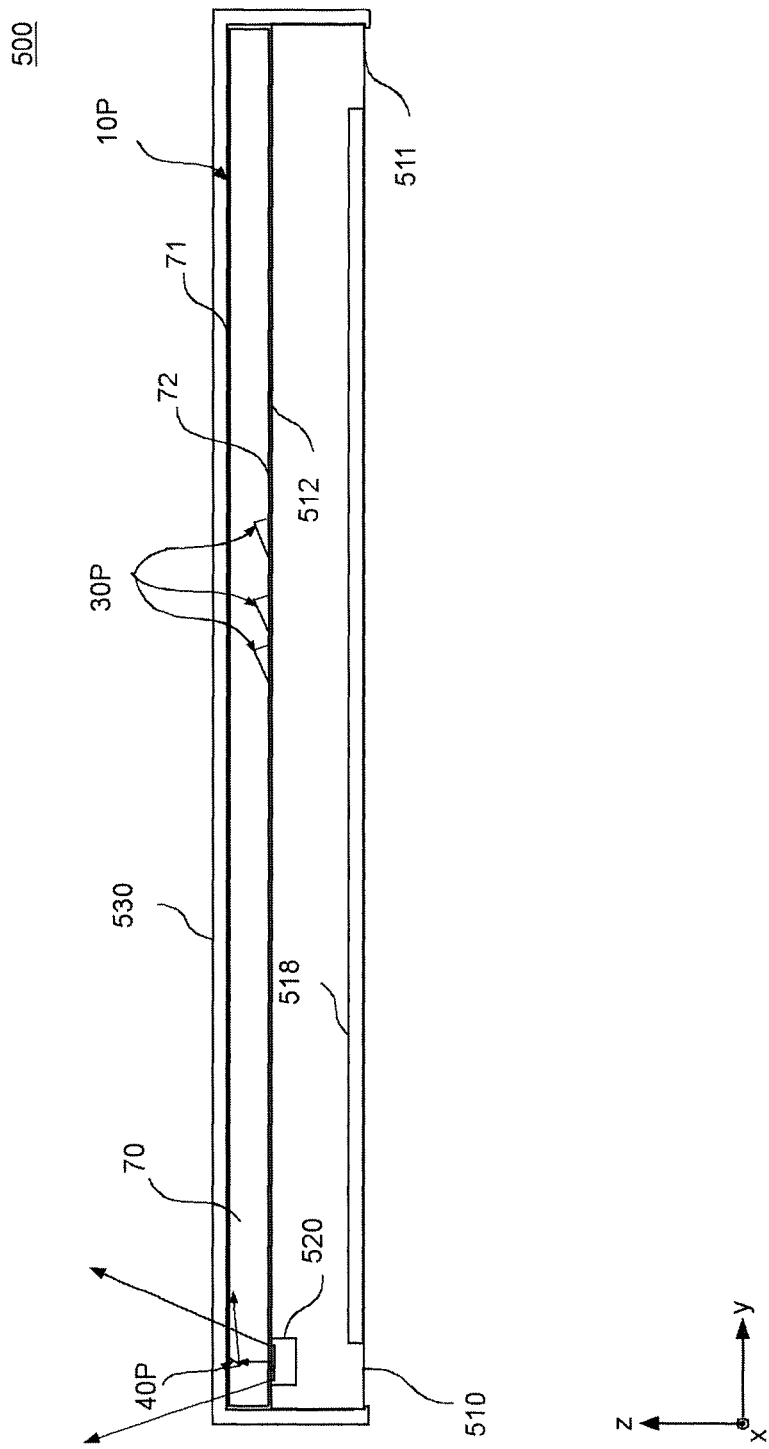

OPTICAL DEVICE

BACKGROUND

Technical Field

The present invention relates to an optical device.

Related Art

A stereoscopic display device, which is equipped with a light guide plate, a light source provided on an edge of the light guide plate, and a mask or a lens array disposed on the front surface of the light guide plate in a parallax barrier system or in a lens array system, is publicly known (for example, Patent Document 1).

Patent Document 1: Japanese Patent Publication No. 2012-008464

SUMMARY

When a light source is provided at an edge of a light guide plate, aligning the light source with the edge of the light guide plate may result in the direction of the light exiting the light guide plate changing when the light source is offset from a prescribed location in a direction parallel to the emission surface of the light guide plate. Additionally, a substrate carrying the light-emitting element may be arranged parallel to the edge, and thus securing a space near the edge large enough to store the substrate may be difficult.

According to one or more embodiments of the present invention, an optical device includes a light guide plate that guides light in a plane parallel to an emission surface; an optical deflection surface that deflects light entering the light guide plate from a light source that faces a plane parallel to at least either the emission surface or the surface opposite the emission surface so that the light travels along the light guide direction of the light guide plate; and a plurality of light focusing portions where each light focusing portion includes an optical surface whereon the light deflected by the optical deflection surface and guided by the light guide plate is incident, and which causes the emission surface to output emission light that converges substantially on a convergence point or convergence line in a space, or that radiates substantially from a convergence point or convergence line in a space; wherein each light focusing portion in the plurality of light focusing portions is formed along a predetermined line in a plane parallel to the emission surface; the convergence points or convergence lines are mutually different among the plurality of light focusing portions; and a group of a plurality of said convergence points or said convergence lines creates an image in a space.

The light source is provided facing at least either the emission surface of the light guide plate or the surface opposite the emission surface, and light may enter the light guide plate from at least the one surface carrying the light source.

The optical deflection surface may include a deflecting reflector surface that is provided on the surface opposite the surface carrying the light source; and the deflecting reflector surface reflecting the light entering the light guide plate from the light source and deflecting the light so that the light travels along the light guide direction of the light guide plate.

The length of the deflecting reflector surface along a direction substantially perpendicular to the light guide direction of the light guide plate may be shorter than the length of an emission window wherefrom light from the light source is emitted toward the light guide plate.

The divergence angle of the light that is deflected by the deflecting reflector surface and guided by the light guide plate may be 5° or less in a plane parallel to the emission surface.

A formula $W \leq L/10$ may be satisfied, where $L$ represents the distance between the incidence edge of the light guide plate and the center of a region where a light focusing portion 30 is formed; and $W$ represents a width of the deflecting reflector surface parallel to the emission surface along a direction substantially perpendicular to the light guide direction of the light guide plate.

A reflective film may be provided on the deflecting reflector surface.

An auxiliary reflector including a surface having a reflective film may be further provided and attached to the light guide plate so that the reflective film comes in contact with the deflecting reflector surface.

A plurality of the deflecting reflector surfaces may be provided along the light guide direction of the light guide plate; each of the plurality of said deflecting reflector surfaces may be different from other deflecting reflector surfaces in at least either the length along a direction perpendicular to the emission surface or the angle relative to a plane parallel to the emission surface in the plane perpendicular to the emission surface and following the light guide direction of the light guide plate.

The deflecting reflector surface may include a first deflecting reflector surface and a second deflecting reflector surface continuing from the first deflecting reflector surface along the light guide direction of the light guide plate; and the angle of the first deflecting reflector surface relative to a plane parallel to the emission surface is different from the angle of the second deflecting reflector surface relative to the plane parallel to the emission surface in the plane perpendicular to the emission surface and following the light guide direction of the light guide plate.

The first deflecting reflector surface and the second deflecting reflector surface constitute a part of the surface of a recess formed in the surface opposite the surface carrying the light source in the light guide plate; and the inclination of the second deflecting reflector surface relative to the plane parallel to the emission surface may be smaller than the inclination of the first deflecting reflector surface relative to the plane parallel to the emission surface in the plane perpendicular to the emission surface and following the light guide direction of the light guide plate.

The optical deflection surface may include reflective surfaces oriented to allow the light entering the light guide plate from the light source to spread in a plane parallel to the light guide direction of the light guide plate.

The light source emits light inside the light guide plate toward a first edge opposite a second edge positioned in the light guide direction of the light guide plate; and the optical deflection surface includes a deflecting reflector surface that is provided on the first edge and converts the light from the light source into substantially parallel light advancing toward the second edge.

The optical device further includes a deflecting part that includes the optical deflection surface and provided on a first edge opposite a second edge positioned in the light guide direction of the light guide plate; wherein the optical deflection surface includes a deflecting reflector surface that converts the light from the light source into substantially parallel light advancing toward the second edge; and the light source emits light advancing toward the deflecting reflector surface inside the deflecting part.

A plurality of said light sources may be arranged side by side in a direction along a plane perpendicular to the light guide direction of the light guide plate and parallel to the emission surface; and a plurality of said deflecting reflector surfaces may be arranged side by side corresponding to the plurality of the light sources in a direction along a plane perpendicular to the light guide direction of the light guide plate and parallel to the emission surface.

The optical device may further include the light source.

It should be noted that the above-described summary does not describe all the features of the present invention, and combinations and sub-combination of feature groups may also be within the scope of the claims.

BRIEF DESCRIPTION OF THE DRAWINGS

FIG. 3 schematically illustrates a plan view of the x-y plane of the display device 10;

FIG. 7 schematically illustrates a display device 100, which is another variation of the display device 10;

FIG. 22 schematically illustrates the y-z cross-section of the optical system 500.

DETAILED DESCRIPTION

Hereinafter, embodiments of the present invention are described with reference to the drawings. The following embodiments do not limit the claimed inventions. Further, the entire combination of the features described in the embodiments is not required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
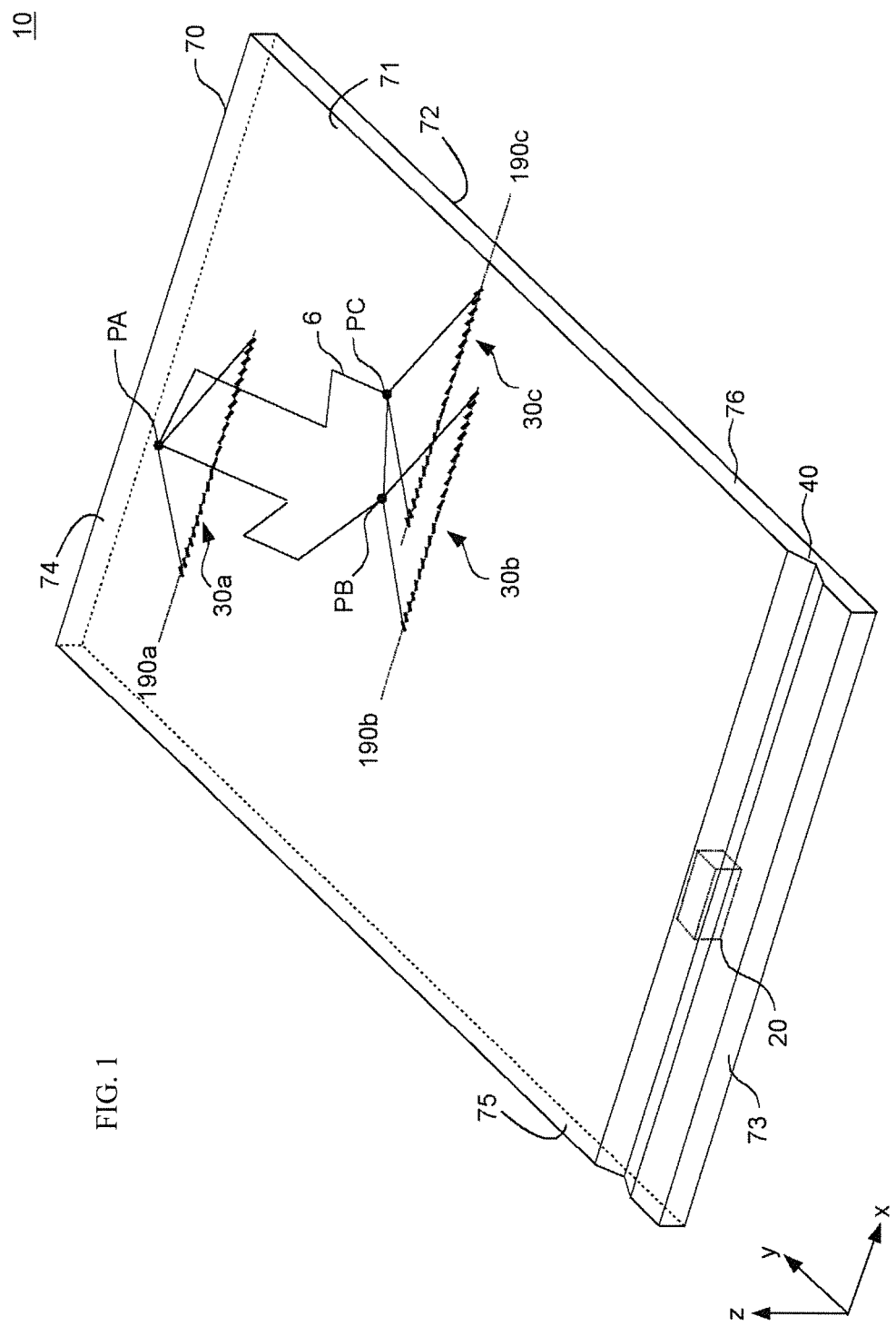
FIG. 1 schematically illustrates a display device 10 according to one or more embodiments of the present invention, along with a three-dimensional image projected into space.

FIG. 1 schematically illustrates a display device 10 according to one or more embodiments of the present invention, along with a three-dimensional image projected into space. For the sake of easier understanding, the drawings for use in the description of the embodiment are schematically illustrated. The drawings for use in the description of the embodiment are not necessarily to scale.

The display device 10 includes an emission surface 71 wherefrom light is emitted. The display device 10 forms an image 6 as a three-dimensional image by way of the light exiting the emission surface 71. The user may perceive the image 6 as a three-dimensional image in a space. Here, the three-dimensional image implies an image that is recognized as being located at a different position from the emission surface 71 of the display device 10. The three-dimensional image includes, for example, a 2D image recognized as being located at a position away from the emission surface 71 of the display device 10. That is, the three-dimensional image conceptually includes not only images recognized as a three-dimensional shape but also 2D images recognized as being located at a different position from the display surface of the display device 10.

The display device 10 includes a light guide plate 70 and a light source 20. The light guide plate 70 is molded using a transparent resin material having a relatively high refractive index. The light guide plate 70 may be made up of, for example, a polycarbonate resin (PC), a polymethyl methacrylate resin (PMMA), glass, or the like.

The light guide plate 70 includes a rear surface 72 opposite the emission surface 71. The light source 20 is provided on the rear surface 72. The light from the light source 20 enters the light guide plate 70 through the rear surface 72. The light guide plate 70 also includes a first edge 73, a second edge 74, a third edge 75 and a fourth edge 76 that are four side edges of the light guide plate 70. The second edge 74 is opposite the first edge 73. The fourth edge 76 is opposite the third edge 75. The light guide plate 70 spreads the light from the light source 20 in a plane parallel to the emission surface 71 and guides the light toward the second edge 74.

In the description of one or more of the embodiments, the right-handed rectangular coordinate system composed of x-axis, y-axis, and z-axis may be used. The z-axis direction is defined as being perpendicular to the emission surface 71. The direction from the rear surface 72 to the emission surface 71 is defined as the positive z-axis direction. Further, the y-axis direction is defined as being perpendicular to the first edge 73. The direction from the first edge 73 to the second edge 74 is defined as the positive y-axis direction. The x-axis is perpendicular to the third edge 75 and the fourth edge 76 and the direction from the third edge 75 to the fourth edge 76 is defined as the positive x-axis direction. For the sake of brevity, a plane parallel to the x-y plane, a plane parallel to the y-z plane, and a plane parallel to the x-z plane may be referred to as an x-y plane, a y-z plane, and an x-z plane, respectively.

The light source 20 is provided to face the rear surface 72. The light from the light source 20 enters the light guide plate 70 through the rear surface 72. A deflecting reflector 40 is provided on the emission surface 71 of the light guide plate 70. The deflecting reflector 40 reflects the light entering the light guide plate 70 from the light source 20 and deflects the light along the light guide direction of the light guide plate 70. For example, the deflecting reflector 40 reflects the light entering the light guide plate 70 from the light source 20 and deflects the light toward the second edge 74. The light guide plate 70 planarly spreads the light deflected by the deflecting reflector 40 in a plane parallel to the emission surface 71 and guides the light toward the second edge 74.

A plurality of light focusing portions 30 including a light focusing portion 30a, a light focusing portion 30b, and a light focusing portion 30c are formed on the rear surface 72 of the light guide plate 70. The light focusing portions 30 are formed for the most part continuing along the x-axis direction. The light guided by the light guide plate 70 is incident onto each position of the light focusing portions 30 along the x-axis direction. The light focusing portions 30 substantially focus the light incident onto each position of the light focusing portions 30 onto fixed points with each point corresponding to the light focusing portions 30. FIG. 1 particularly illustrates the light focusing portion 30a, the light focusing portion 30b, and the light focusing portion 30c, as part of the light focusing portions 30, and shows how a plurality of light beams emanating from each of the light focusing portion 30a, the light focusing portion 30b, and the light focusing portion 30c converge for each of the light focusing portion 30a, the light focusing portion 30b, and the light focusing portion 30c.

Specifically, the light focusing portion 30a corresponds to a fixed point PA on the image 6. The light beams from each position of the light focusing portion 30a converge onto the fixed point PA. As such, a wavefront of the light from the light focusing portion 30a appears as a wavefront of the light emanating from the fixed point PA. The light focusing portion 30b corresponds to a fixed point PB on the image 6. The light beams from each position of the light focusing portion 30b converge onto the fixed point PB. In this way, the light beams from each position of any light focusing portion 30 converge substantially onto the fixed point corresponding to the light focusing portion 30. Thereby, the wavefront of light can be presented by way of any light focusing portion 30 so that the light appears to be emanating from a corresponding fixed point. The fixed points corresponding each of the light focusing portions 30 are mutually different, and thus a grouping of a plurality of fixed points can create an image 6 visible in a space can where each fixed point corresponds to a light focusing portion 30. The display device 10 thus projects a three-dimensional image into a space.

According to one or more embodiments of the present invention, each of the light focusing portions 30 includes many reflective surfaces formed for the most part continuing along the x-axis direction. The reflection light from the reflective surface included in any light focusing portion 30 converges onto a fixed point corresponding to the light focusing portion 30. For example, a plurality of reflected beams from each of the plurality of reflective surfaces included in the light focusing portion 30a converges onto the fixed point PA. Further, a plurality of reflected light beams from each of the plurality of reflective surfaces included in the light focusing portion 30b converges onto the fixed point PB. Further, a plurality of reflected light beams from each of the plurality of reflective surfaces included in the light focusing portion 30c converges onto the fixed point PC.

A beam guided by the light guide plate 70 and passing through each position of the light guide plate 70 has a smaller beam spread angle than a prescribed value in the x-y plane when a direction connecting the light source 20 and each position in the light guide plate 70 is defined as the center. Further, the light beam guided by the light guide plate 70 and passing through each position of the light guide plate 70 has a smaller beam spread angle than a prescribed value in a plane perpendicular to the x-y plane including the line connecting the light source 20 and each position in the light guide plate 70 when the direction connecting the light source 20 and each position in the light guide plate 70 is defined as the center. When the light focusing portion 30 is provided away from the light source 20, the beam that is guided by the light guide plate 70 and enters the light focusing portion 30 exhibits little spread in the x-y plane with the y-axis direction as the center. Accordingly, the light from the light focusing portion 30a converges onto substantially a single fixed point, for example, in a plane parallel to the x-z plane including the fixed point PA. Here, in this specification the spread of a beam passing through points inside and outside the light guide plate refers to the spread of light when said beam can be regarded as the light radiating from those points. The spread of the beam passing through inside and outside the light guide plate may be simply referred to as "the spread of light."

As shown in FIG. 1, the light focusing portion 30a is formed along a line 190a. The light focusing portion 30b is formed along a line 190b. The light focusing portion 30c is formed along a line 190c. Here, the lines 190a, 190b, and 190c are straight lines substantially parallel to the x-axis. Any light focusing portion 30 is formed for the most part continuing along a straight line substantially parallel to the x-axis.

In this way, the light focusing portions 30 are each formed along predetermined lines in a plane parallel to the emission surface 71. Each light focusing portion 30 receives the light guided by the light guide plate 70 and causes the emission surface 71 to output emission light along a direction so that the emission light converges substantially onto a single convergence point in space. Note that the emission light is output along a direction so that the emission light radiates from the fixed point when the fixed point is located near the rear surface 72 of the light guide plate 70. Therefore, when the fixed point is located near the rear surface 72 of the light guide plate 70, the reflective surface included in the light focusing portion 30 causes the emission surface 71 to output the emission light along a direction so that the emission light radiates from substantially one convergence point in space.

Further, when the light guided by the light guide plate 70 exhibits little spread along a direction parallel to the y-z plane, the light from the light focusing portion 30 is substantially converged onto the fixed point as described above. On the other hand, when the light guided by the light guide plate 70 spreads to some extent along a direction parallel to the y-z plane, the light reflected from the reflective surface of the light focusing portion 30 converges substantially onto a convergence line parallel to the y-z plane and the emission surface. For example, the light created by the light focusing portion 30a converges substantially onto a line that is parallel to the y-z plane and the emission surface and includes the PA. Similarly, when the fixed point is located near the rear surface 72 of the light guide plate 70, the reflective surface included in the light focusing portion 30 causes the emission surface 71 to output the emission light along a direction so that the emission light radiates from substantially one convergence line in space. For the sake of brevity, one or more embodiments of the present invention has light from the light focusing portion 30 that converges substantially on a convergence point. The light focusing portions 30 may be made up of a portion of a Fresnel lens respectively. Alternatively, a single light focusing portion 30 may made up of a single continuous Fresnel lens.

Figure 2:
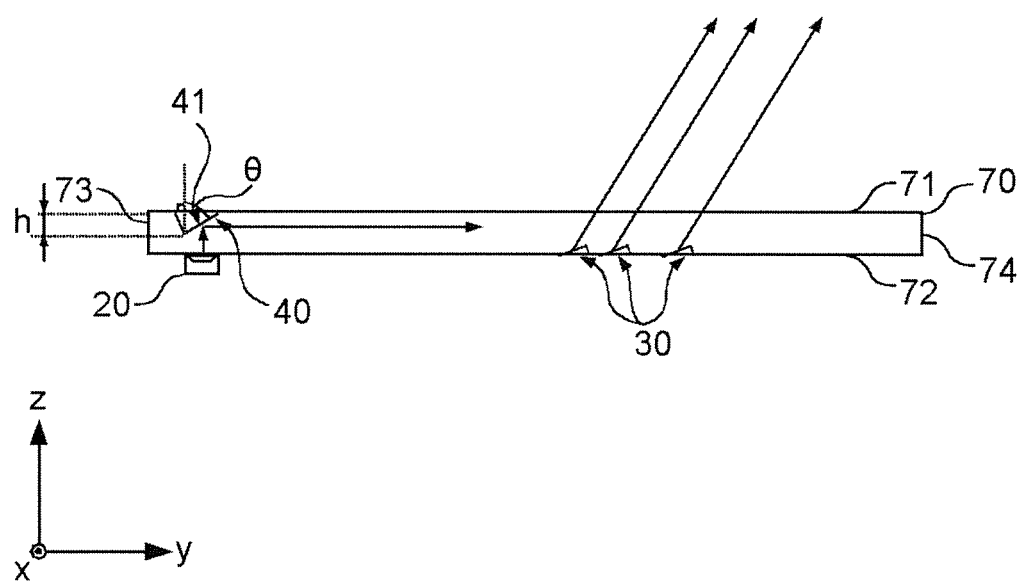
FIG. 2 schematically illustrates a cross-section of the y-z plane of the display device 10.

FIG. 2 schematically illustrates a cross-section of the y-z plane of the display device 10. FIG. 3 schematically illustrates a plan view of the x-y plane of the display device 10.

The light source 20 is, for example, an LED light source. Light from the light source 20 enters through the rear surface 72 along the z-axis direction. The deflecting reflector 40 is a groove made in the emission surface 71. Specifically the deflecting reflector 40 is a groove with a roughly V-shaped cross-section in the y-z plane. The deflecting reflector 40 has a deflecting reflector surface 41. The deflecting reflector surface 41 is the surface of the roughly V-shaped groove in the y-z plane near where the light guide plate 70 guides light. The deflecting reflector surface 41 makes a forward angle θ relative to an axis parallel to the z-axis in the y-z plane. The depth h of the deflecting reflector surface 41 is the length from the emission surface 71 to the tip of the deflecting reflector surface 41. The light source 20 is located toward the negative z-axis of the deflecting reflector surface 41. The light from the light source 20 is reflected from the deflecting reflector surface 41 and deflected in the light guide direction of the light guide plate 70.

According to the display device 10, the light source 20 is provided on the rear surface 72, which simplifies positioning the light source 20 compared to when the light source 20 is provided on the first edge 73. Further, the substrate carrying a light-emitting element does not need to be parallel to an edge, and thus it is not necessary to secure a space large enough to store the substrate near the first edge 73.

When the light source 20 is provided on a first edge 73, if the position of the light source 20 is shifted along the x-axis direction, the reference point of the light entering the light guide plate 70 is also shifted along the x-axis direction. Thereby, the position of the convergence point of light from the light focusing portion 30 shifts along the x-axis direction, which can cause an image formed by the light focusing portion 30 to shift and distort along the x-axis direction. Whereas, according to the display device 10, the light emitted from the light source 20 enters the light guide plate 70 through the rear surface 72, and the light guide plate 70 guides the light deflected by the deflecting reflector surface 41. As such, the reference point of the light guided by the light guide plate 70 is defined as the position where the deflecting reflector surface 41 is formed. Accordingly, even if the position of the light source 20 is shifted along the x-axis direction, the reference point of light does not shift. Therefore, this display device 10 can prevent an image created by the light focusing portion 30 from being shifted and distorted along the x-axis direction.

Figure 4:
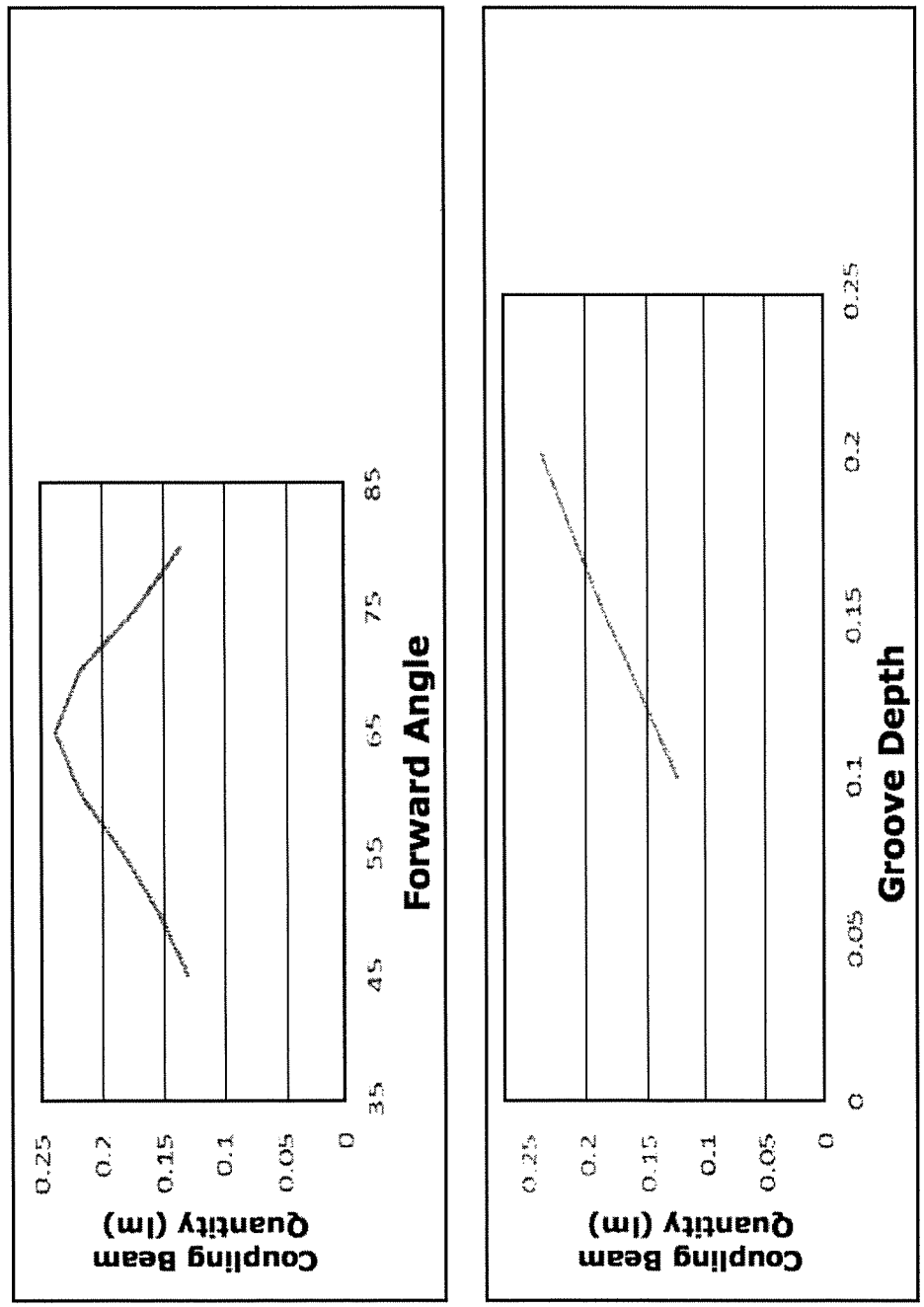
FIG. 4 illustrates the dependency of the coupling beam quantity of the light guide plate on the forward angle θ and the depth h.

FIG. 4 illustrates the dependency of the coupling beam quantity of the light guide plate on forward angle θ and on the depth h. The light guide plate is made of a polycarbonate (PC) and has a thickness of 0.3 mm. Theses dependencies are acquired while keeping the groove depth h, i.e., the length from the emission surface 71 to the tip of the deflecting reflector surface 41, fixed. The reflectance of the deflecting reflector surface 41 is set to 80%. When the depth of the reflective surface is fixed, the coupling beam quantity reaches at maximum when θ is approximately 65°. Further, the coupling beam quantity is dependent on the depth h. The results showed that the forward angle θ of the deflecting reflector surface 41 is set to approximately 65°, according to one or more embodiments of the present invention.

Figure 5:
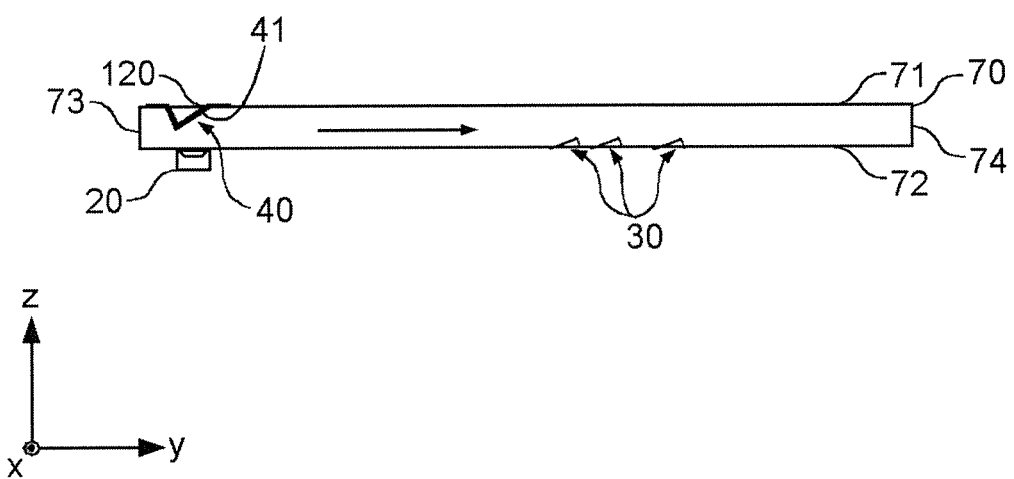
FIG. 5 schematically illustrates a display device 10A, which is a variation of the display device 10.

FIG. 5 schematically illustrates a display device 10A, which is a variation of the display device 10. The display device 10A is provided with a reflective film 120 in addition to the components included in the display device 10. The reflective film 120 is provided on the deflecting reflector surface 41. The reflective film 120 is provided on the emission surface 71. The reflective film 120 is provided to cover at least the deflecting reflector surface 41. The reflective film 120 may be, for example, an evaporated silver film. Providing the reflective film 120 on the deflecting reflector 40 can improve coupling efficiency. Besides the evaporated silver film, a silver-plated copper alloy strip or a reflective sheet or the like may be adopted as the reflective film 120.

Figure 6:
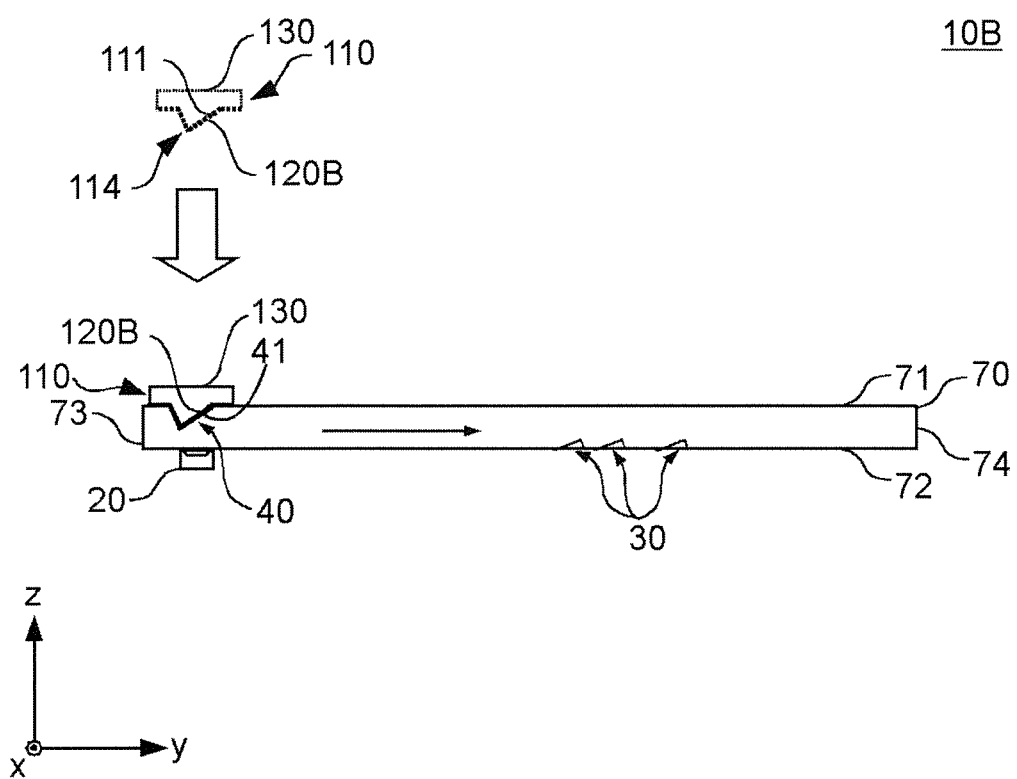
FIG. 6 schematically illustrates a display device 10B, which is another variation of the display device 10.

FIG. 6 schematically illustrates a display device 10B, which is another variation of the display device 10. The display device 10A is provided with an auxiliary reflector 110 in addition to the components included in the display device 10. The auxiliary reflector 110 includes a body 130 and a reflective film 120B.

The body 130 of the auxiliary reflector 110 includes a projection 114 adapted to fit into the recess of the deflecting reflector 40. The reflective film 120B is formed on at least a part of the projection 114. More specifically, the projection 114 includes a surface 111 that faces the defecting reflector surface 41 when the auxiliary reflector 110 fits in the deflecting reflector 40 and the reflective film 120B is formed on the surface 111. The reflective film 120B is provided to cover at least the surface 111. When the auxiliary reflector 110 fits in the deflecting reflector 40, the reflective film 120B comes substantially in contact with the deflecting reflector surface 41. The reflective film 120B may be made of, for example, an evaporated silver film.

As such, the auxiliary reflector 110 includes the surface 111 having the reflective film 120B provided thereon, and is adhered to the light guide plate 70 so that the reflective film 120B comes in contact with the deflecting reflector surface 41. With this configuration, beam-coupling efficiency between the light source 20 and the light guide plate 70 may be improved without directly forming a reflective film on the light guide plate 70. Besides the evaporated silver film, a silver-plated copper alloy strip or a reflective sheet or the like may be adopted as the reflective film 120. Furthermore, a silver-plated film, a chrome-plated film, an evaporated aluminum film, or a reflective sheet or the like may apply to the reflective film 120B. The body 130 of the auxiliary reflector 110 may be made of a transparent material or a non-transparent material.

The auxiliary reflector 110 may be modified by applying a mirror-finish to the surface 111 of the body 130 without providing the reflective film 120B. The body 130 may be made of metal.

FIG. 7 schematically illustrates a display device 100, which is another variation of the display device 10. The display device 100 includes a deflecting reflector 400 in place of the deflecting reflector 40. The deflecting reflector 400 has the same structure as the deflecting reflector 40 except that the length W along the x-axis direction is shorter than that of the deflecting reflector 40.

As illustrated in the drawing, light is emitted from the light source 20 via an emission window 21 toward the light guide plate 70; w represents the length of the emission window 21 along the x-axis direction. A length W of the deflecting reflector 400 is shorter than the length w of an output window 200 along the x-axis direction. The x-axis direction is substantially perpendicular to the light guide direction of the light guide plate 70.

When the length W of the deflecting reflector 400 is shorter than the length w of the emission window 21, the spread in the x-y plane of the light guided by the light guide plate 70 may be reduced without controlling the size of the emission window 21. This allows the light with a smaller beam spread angle in the x-y plane than a prescribed angle to enter one of the reflective surfaces included in the light focusing portion 30. Accordingly, the resolution of the three-dimensional image 6 improves.

As an example, according to one or more embodiments of the present invention, D≤L/10 is satisfied in order to form a high-resolution 3D image, where L represents a length between the position of the deflecting reflector 400 in the light guide plate 70 and the center position C of the emission surface 71; and D represents width of the spread of light at the position of the deflecting reflector 400. Here, the length W along the x-axis direction of the deflecting reflector 400 may apply to the width of the spread of light from the deflecting reflector 400. The parameter D may also represent the spread of the width of an intensity distribution for the light deflected by the deflecting reflector 400. For example, when the distribution of beam intensity is defined by the horizontal axis representing positions along the x-axis direction and the vertical axis representing light intensity, D may represent the full width at a position where the light intensity is reduced to half of the maximum (full width at half maximum).

Figure 8:
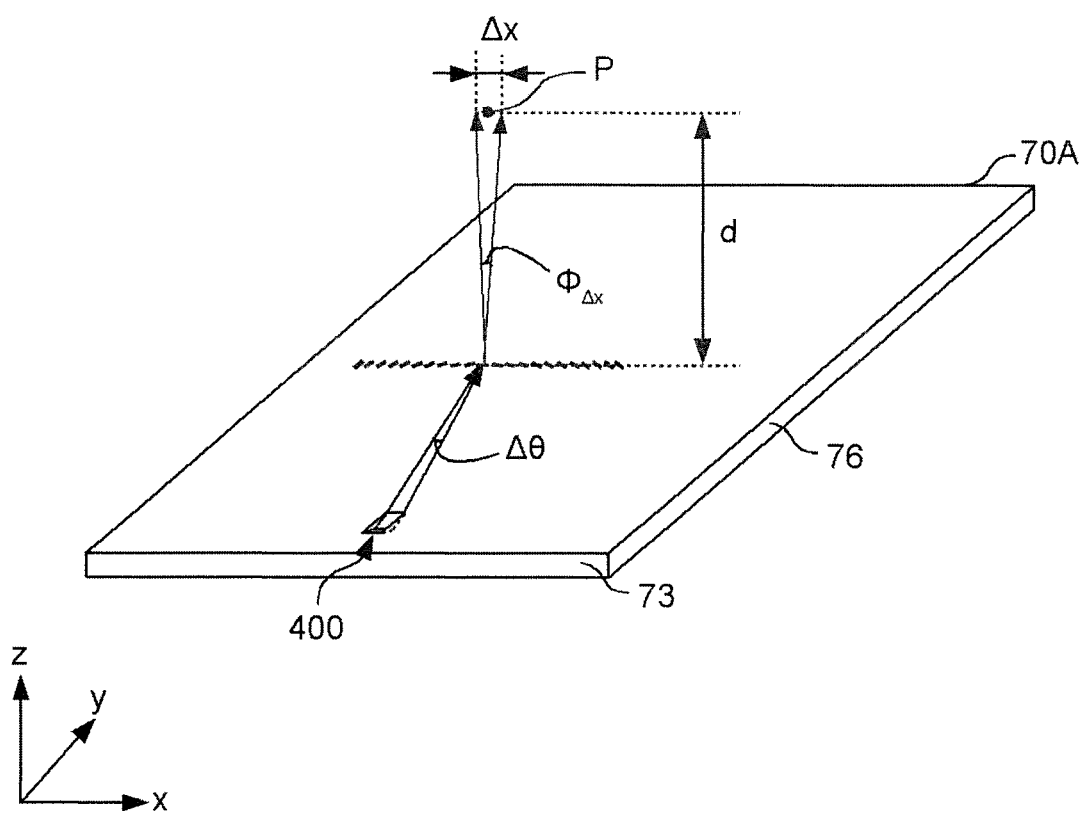
FIG. 8 schematically illustrates the relationship between the divergence angle $\Delta\theta$ of incident light onto one reflective surface among the reflective surfaces included in the light focusing portion 30 and the beam spread angle $\Phi\Delta$ of emission light.

FIG. 8 schematically illustrates the relationship between the beam spread angle Δθ of light incident onto one of the reflective surfaces included in the light focusing portion 30 and the beam spread angle ΦΔ of emission light. The angle Δθ represents the beam spread angle of the light guided by the light guide plate 70 at the position of a reflective surface. Specifically, the angle Δθ represents the beam spread angle in the x-y plane, that is, the beam spread angle in a plane parallel to the emission surface 71. The angle Δθ may represent a width at a position where the light intensity is reduced to half of the maximum (full width at half maximum) in the angular light intensity distribution.

In FIG. 8, Δx represents the spread at the fixed point P along the x-axis direction of the emission light due to a reflective surface 140; d represents the length from the emission surface 71 to the fixed point P. Here, the light incident on the reflective surface and the spread of emission light due to the reflective surface is taken as smaller than a prescribed value. For example, Δx and Δθ are extremely small. In this case, ΦΔx=Δx/d is approximately satisfied. As such, reducing the length W along the x-axis direction of the deflecting reflector 400 can reduce the spread Δx of the emission light. That is, the resolution of a three-dimensional image can be improved.

The emission light may actually be refracted at the emission surface 71, and therefore the divergence angle ΦΔx may be greater than the angle Δθ. Here, the divergence angle ΦΔx is assumed to be Cα times larger than the angle Δθ. Cα is larger than 1. As an example, Cα may be 1.5.

Here, the fixed point P is located near the emission surface 71, that is, the fixed point P may be near an observer; in that case d is set to 8 mm or more according to one or more embodiments of the present invention. This is because, if d is less than 8 mm, an object may be hard to perceive as a three-dimensional image. Further, according to one or more embodiments of the present invention, Δx is set to 1 mm or less. This is because, if Δx is greater than 1 mm, the three-dimensional image may have an insufficient resolution.

Therefore, according to one or more embodiments of the present invention, ΦΔx is set to a tan (⅛) or less. That is, according to one or more embodiments of the present invention, Δθ satisfies the formula Cα×Δθ≤a tan (⅛). The angle Δθ is set to 5° or less in view of Cα according to one or more embodiments of the present invention. That is, the divergence angle of the light guided by the light guide plate 70 after being deflected by the deflecting reflector 400 is set to 5° or less in a plane parallel to the emission surface 71, according to one or more embodiments of the present invention. Here, according to one or more embodiments of the present invention, the width W of the deflecting reflector 400 is adjusted so that the divergence angle of light is 5° or less in the plane parallel to the emission surface 71.

Figure 9A:
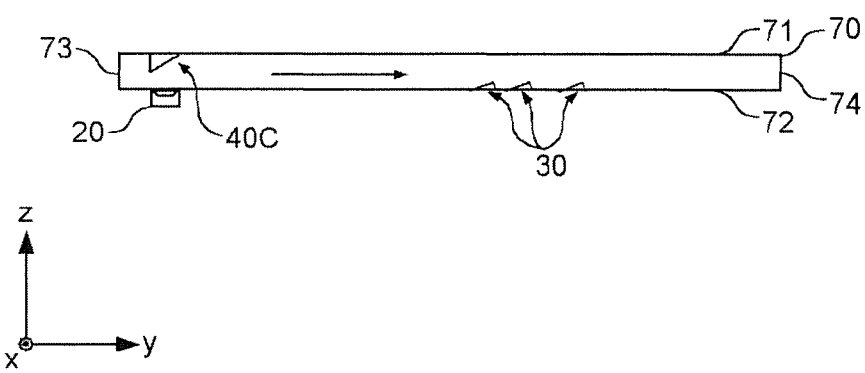
FIGS. 9(a)-9(b) schematically illustrate a display device 10C, which is another variation of the display device 10.
Figure 9B:
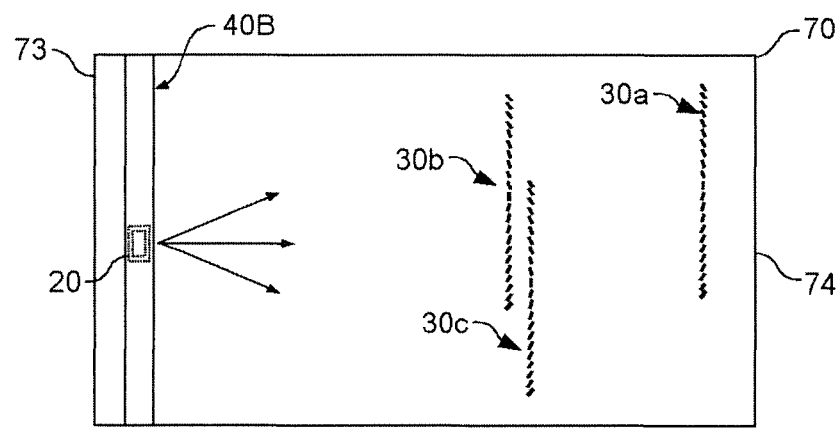

FIGS. 9(a)-9(B) schematically illustrate a display device 10C, which is another variation of the display device 10. FIG. 9(a) illustrates a cross-section in the y-z plane, and FIG. 9(b) illustrates a top plan view in the x-y plane. The display device 10C has substantially the same structure as the display device 10 except that the shape of the deflecting reflector 40C is different from that of the deflecting reflector 40. The deflecting reflector 40 is a V-shaped groove inclined on both the side near the first edge 73 and the side near the second edge 74, whereas the deflecting reflector 40C is a V-shaped groove inclined on the side near the second edge 74 but not on the side near the first edge 73.

Figure 10A:
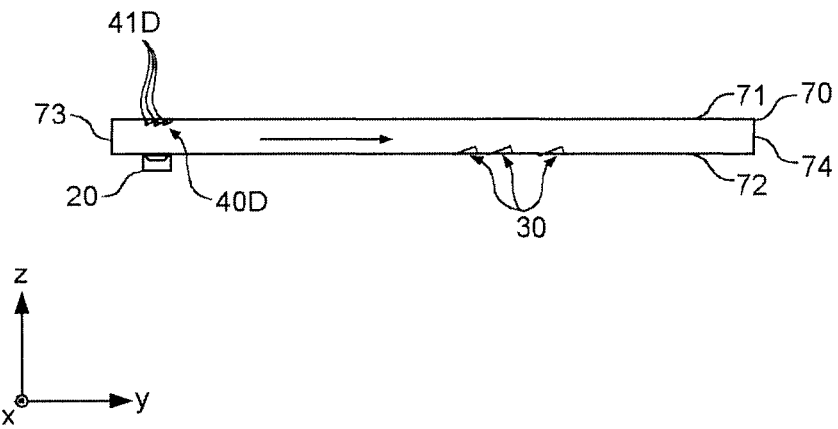
FIGS. 10(a)-10(b) schematically illustrate a display device 10D, which is another variation of the display device 10.
Figure 10B:
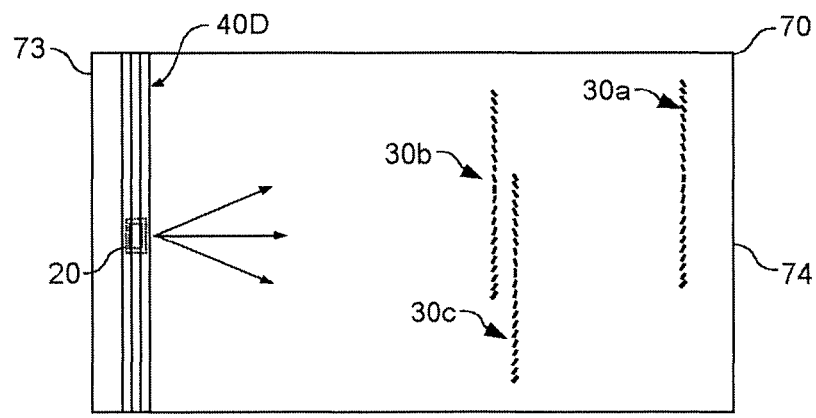

FIGS. 10(a)-10(b) schematically illustrate a display device 10D, which is another variation of the display device 10. FIG. 10(a) illustrates a cross-section in the y-z plane, and FIG. 10(b) illustrates a top plan view in the x-y plane. The display device 10D has substantially the same structure as the display device 10 except that the shape of a deflecting reflector 40D is different from that of the deflecting reflector 40. While the deflecting reflector 40 has one deflecting reflector surface 41, the deflecting reflector 40D has a plurality of deflecting reflector surfaces 41D. The plurality of deflecting reflector surfaces 41D is provided along the light guide direction of the light guide pate 70.

Figure 11:
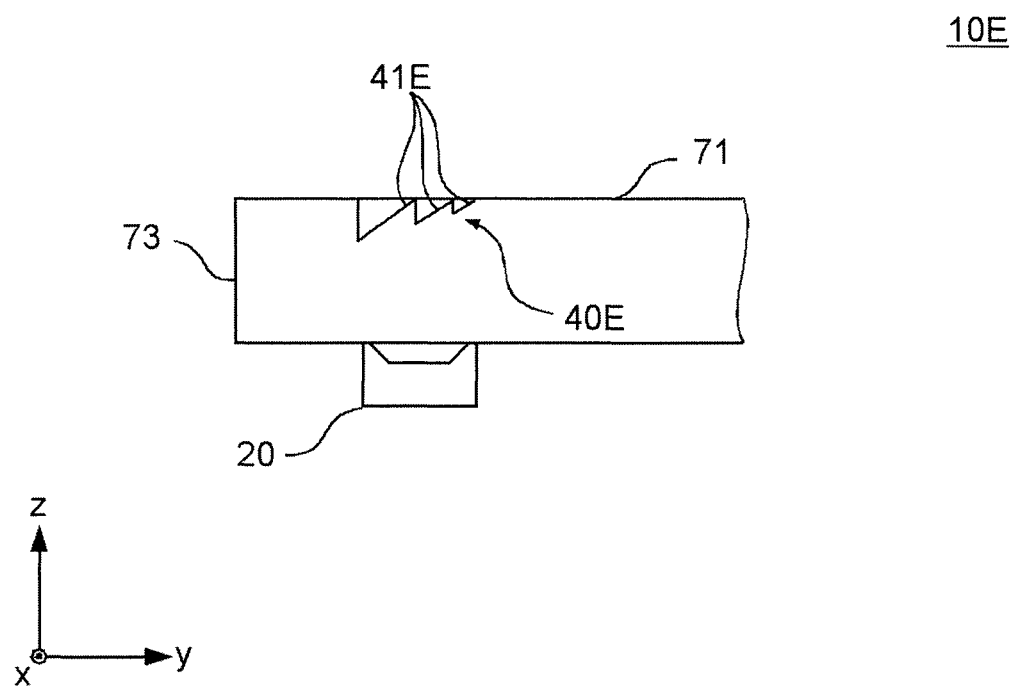
FIG. 11 schematically illustrates a partially enlarged portion of a display device 10E, which is another variation of the display device 10.

FIG. 11 schematically illustrates a partially enlarged portion of a display device 10E, which is another variation of the display device 10. The display device 10E has substantially the same structure as the display device 10 except that the shape of a deflecting reflector 40E is different from that of the deflecting reflector 40. While the deflecting reflector 40 has one deflecting reflector surface 41, the deflecting reflector 40E has a plurality of deflecting reflector surfaces 41E. The plurality of deflecting reflector surfaces 41E is provided along the light guide direction of the light guide pate 70. In particular, the deflecting reflector surfaces 41E have mutually different groove depths from the emission surface 71. That is, each deflecting reflector surface 41E has a length perpendicular to the emission surface 71 different from other deflecting reflector surfaces 41E in the plane perpendicular to the emission surface 71 and parallel to the light guide direction of the light guide plate 70.

Figure 12:
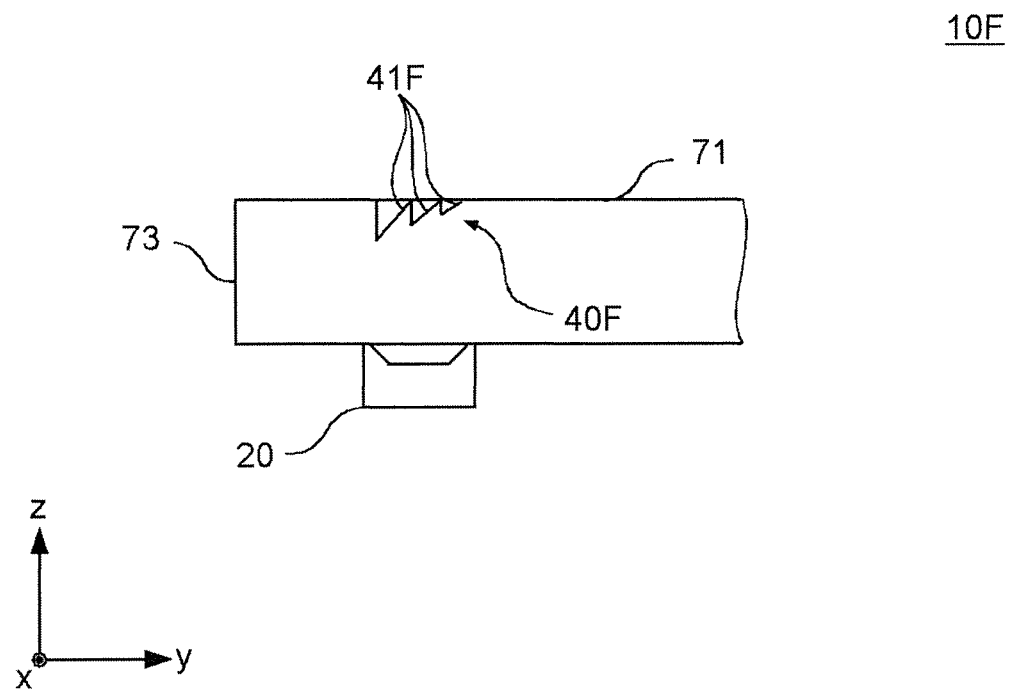
FIG. 12 schematically illustrates a partially enlarged portion of a display device 10F, which is another variation of the display device 10.

FIG. 12 schematically illustrates a partially enlarged portion of a display device 10F, which is another variation of the display device 10. The display device 10F has substantially the same structure as the display device 10 except that the shape of a deflecting reflector 40F is different from that of the deflecting reflector 40. While the deflecting reflector 40 has one deflecting reflector surface 41, the deflecting reflector 40F has a plurality of deflecting reflector surfaces 41F. The plurality of deflecting reflector surfaces 41F is provided along the light guide direction of the light guide pate 70. In particular, the deflecting reflector surfaces 41F are at mutually different groove depths from the emission surface 71, and are at mutually different angles relative to the emission surface 71. That is, each deflecting reflector surface 41F is different in the length perpendicular to the emission surface 71 and an angle relative to a surface parallel to the emission surface 71 from other deflecting reflector surfaces 41F in the plane perpendicular to the emission surface 71 and parallel to the light guide direction of the light guide plate 70.

Figure 13:
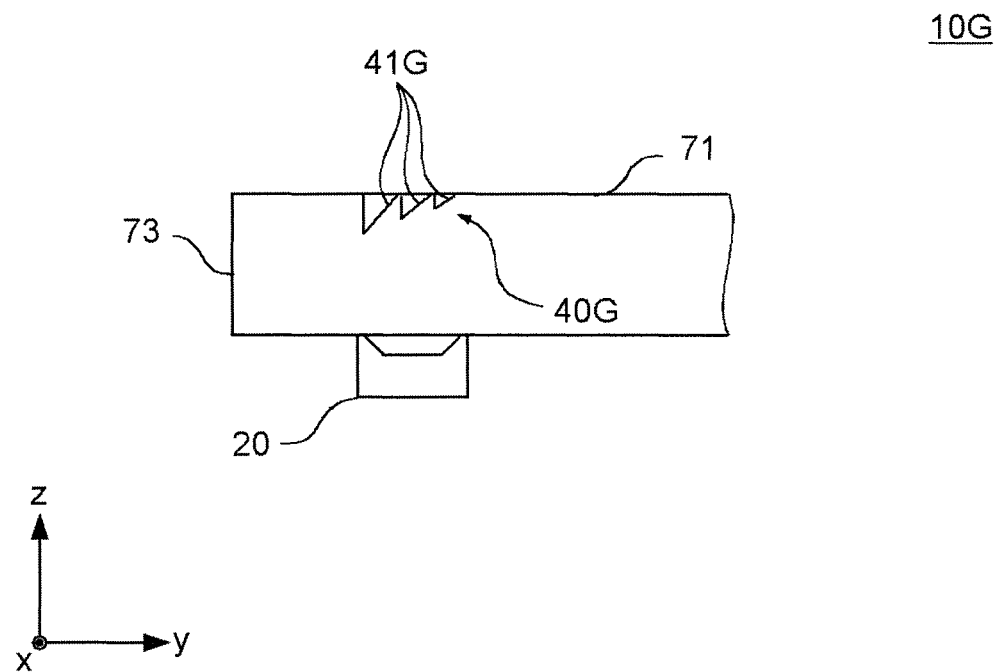
FIG. 13 schematically illustrates a partially enlarged portion of a display device 10G, which is another variation of the display device 10.

FIG. 13 schematically illustrates a partially enlarged portion of a display device 10G, which is another variation of the display device 10. The display device 10G has substantially the same structure as the display device 10 except that the shape of a deflecting reflector 40G is different from that of the deflecting reflector 40. While the deflecting reflector 40 has one deflecting reflector surface 41, the deflecting reflector 40G has a plurality of deflecting reflector surfaces 41G. The plurality of deflecting reflector surfaces 41G is provided along the light guide direction of the light guide pate 70. In particular, the deflecting reflector surfaces 41G are at mutually different groove depths from the emission surface 71, and are at mutually different angles relative to the emission surface 71. That is, each deflecting reflector surface 41G is different in the length perpendicular to the emission surface 71 and an angle relative to a surface parallel to the emission surface 71 from other deflecting reflector surfaces 41G in the plane perpendicular to the emission surface 71 and parallel to the light guide direction of the light guide plate 70. The deflecting reflector 40G is different from the deflecting reflector 40F in that the deflecting reflector 40G has a gap surface parallel to the emission surface 71 between each of the deflecting reflector surfaces 41G.

Figure 14:
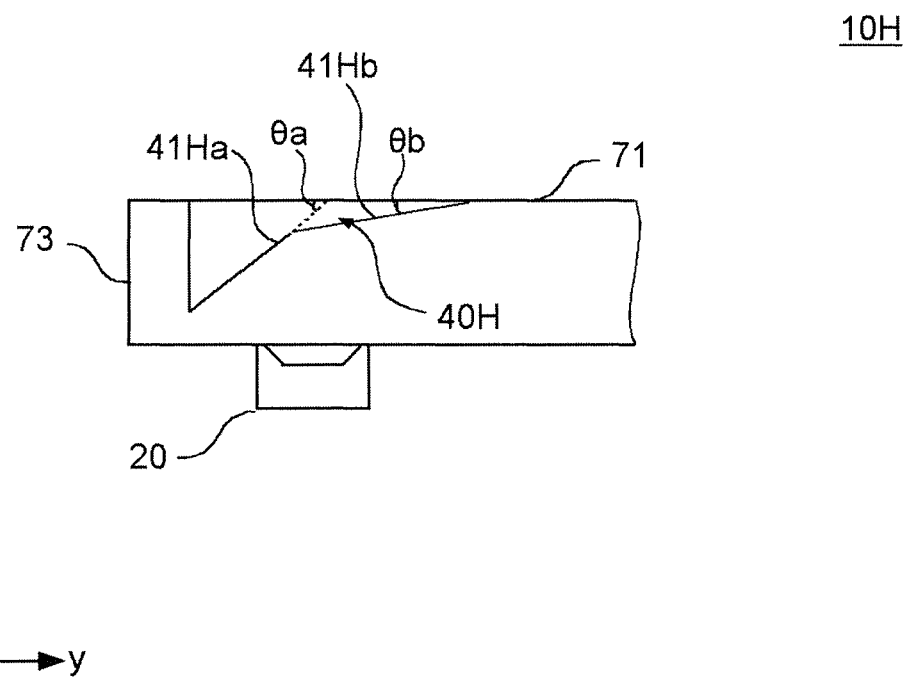
FIG. 14 schematically illustrates a partially enlarged portion of a display device 10H, which is another variation of the display device 10.

FIG. 14 schematically illustrates a partially enlarged portion of a display device 10H, which is another variation of the display device 10. The display device 10H has substantially the same structure as the display device 10 except that the shape of a deflecting reflector 40H is different from that of the deflecting reflector 40. While the deflecting reflector 40 has one deflecting reflector surface 41, the deflecting reflector 40H has two deflecting reflector surfaces including a deflecting reflector surface 41Ha and a deflecting reflector surface 41Hb that continues from the deflecting reflector surface 41Ha along the light guiding direction of the light guide pate 70.

The deflecting reflector 40H is formed as a recess in the emission surface 71 of the light guide plate 70, and the deflecting reflector surface 41Ha and a deflecting reflector surface 41Hb are the surfaces that are toward the y-axis in the deflecting reflector 40H. The deflecting reflector surface 41Hb is located further along the positive y-axis compared to the deflecting reflector surface 41Ha. The light source 20 is provided toward the negative z-axis relative to the deflecting reflector surface 41Ha. The deflecting reflector surface 41Ha is provided closer to the light source 20 than the deflecting reflector surface 41Hb.

An angle $\theta b$ between a plane parallel to the emission surface 71 and the deflecting reflector surface 41Hb differs from the angle $\theta a$ between a plane parallel to the emission surface 71 and the deflecting reflector surface 41Ha in the plane perpendicular to the emission surface 71 and parallel to the light guide direction of the light guide plate 70. The angle $\theta a$ is an acute angle sandwiched between a plane parallel to the emission surface 71 and the deflecting reflector surface 41Ha and represents the inclination of the deflecting reflector surface 41Ha relative to the plane parallel to the emission surface 71. Further, the angle $\theta b$ is an acute angle sandwiched between a plane parallel to the emission surface 71 and the deflecting reflector surface 41Hb and represents an inclination of the deflecting reflector surface 41Hb relative to the plane parallel to the emission surface 71.

As described above, the inclination of the deflecting reflector surface 41Hb relative to the plane parallel to the emission surface 71 differs from the inclination of the deflecting reflector surface 41Ha relative to the plane parallel to the emission surface 71 in the plane perpendicular to the emission surface 71 and parallel to the light guide direction of the light guide plate 70. Specifically, the inclination of the deflecting reflector surface 41Hb relative to the plane parallel to the emission surface 71 is smaller than the inclination of the deflecting reflector surface 41Ha relative to the plane parallel to the emission surface 71 in a plane perpendicular to the emission surface 71 and parallel to the light guide direction of the light guide plate 70. Therefore, the area of the deflecting reflector surface can be made larger. Accordingly, more light from the light source 20 can be supplied to the light guide plate 70.

Further, three or more continuous deflecting reflector surfaces may be provided along the light guide direction of the light guide plate 70 as a variation of the display device 10H. According to this variation, the deflecting reflector surfaces 41 may be selected sequentially along the direction light is guided by the light guide plate 70; the inclination of the deflecting reflector surface may gradually decrease in this case in the plane perpendicular to the emission surface 71 and parallel to the light guide direction of the light guide plate 70. That is, the inclination of each deflecting reflector surface is smaller than the inclination of any other deflecting reflector surfaces provided closer to the light source 20.

Figure 15:
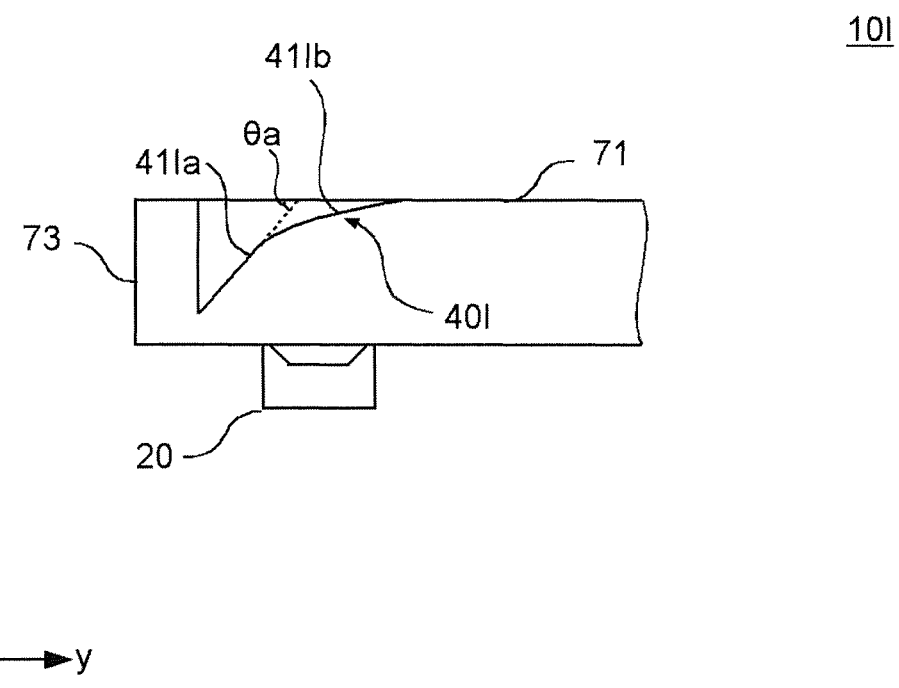
FIG. 15 schematically illustrates a partially enlarged portion of a display device 10I, which is a variation of the display device 10H.

FIG. 15 schematically illustrates a partially enlarged portion of a display device 10I, which is a variation of the display device 10H. The display device 10I has substantially the same structure as the display device 10H except that the shape of a deflecting reflector 40Ib is different from that of the deflecting reflector 40Hb. Specifically, while the deflecting reflector surface 41Hb is flat, the deflecting reflector 41Ib is curved.

Similarly to the display device 10H, the angle $\theta a$ is formed between a plane parallel to the emission surface 71 and the deflecting reflector surface 41I*a* in the plane perpendicular to the emission surface 71 and parallel to the light guide direction of the light guide plate 70. Here, the acute angle sandwiched between a plane parallel to the emission surface 71 and the tangential line of the deflecting reflector surface 41Ib is smaller than the angle $\theta a$ at any position on the deflecting reflector surface 41Ib in the plane perpendicular to the emission surface 71 and parallel to the light guide direction of the light guide plate 70. Further, the acute angle sandwiched between a plane parallel to the emission surface 71 and the tangential line of the deflecting reflector surface 41Ib in the plane perpendicular to the emission surface 71 and parallel to the light guide direction of the light guide plate 70 gradually decreases along the direction the light guide plate 70 guides light.

As such, the inclination of the deflecting reflector surface 41Ib relative to a plane parallel to the emission surface 71 is smaller than the inclination of the deflecting reflector surface 41Ia relative to the plane parallel to the emission surface 71 at any position on the deflecting reflector surface 41Ib in the plane perpendicular to the emission surface 71 and parallel to the light guide direction of the light guide plate 70. Further, the inclination of the deflecting reflector surface 41I*b* relative to the plane parallel to the emission surface 71 gradually decreases along the direction the light guide plate 70 guides light. The area of such a deflecting deflector surface 41I may be larger, thereby allowing the light source 20 to supply the light guide plate 70 with more light.

Figure 16A:
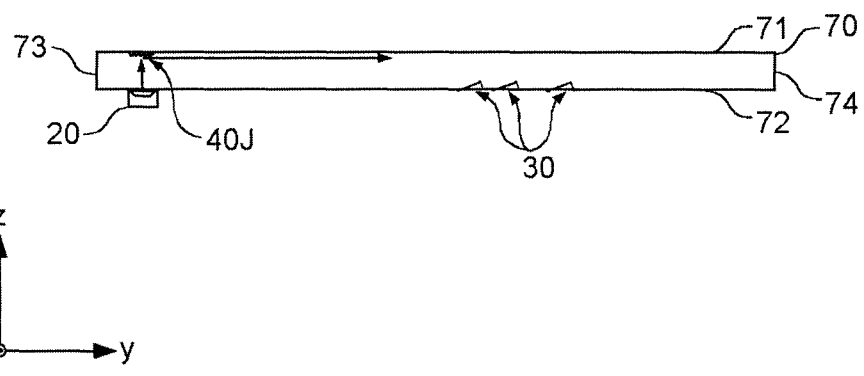
FIGS. 16(a)-16(b) schematically illustrate a partially enlarged portion of a display device 10J, which is another variation of the display device 10.
Figure 16B:
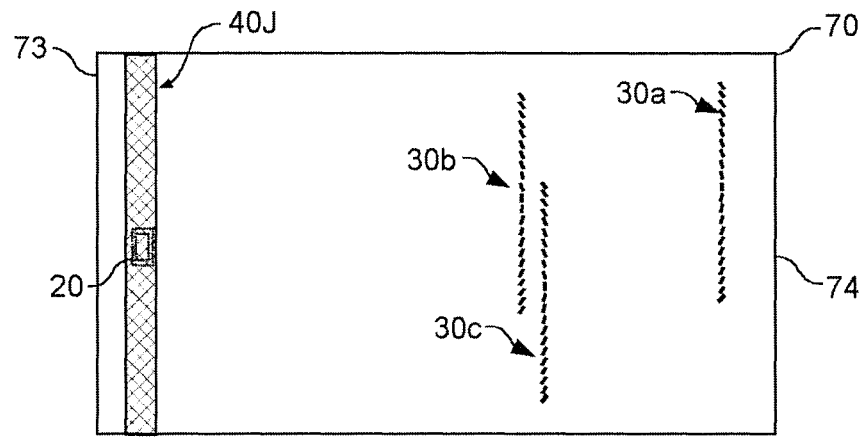

FIGS. 16(*a*)-16(*b*) schematically illustrate a partially enlarged portion of a display device 10J, which is a variation of the display device 10. FIG. 16(*a*) illustrates a cross-section in the y-z plane, and FIG. 16(*b*) illustrates a top plan view in the x-y plane. The display device 10J has substantially the same structure as the display device 10 except that the shape of a deflecting reflector 40J differs from that of the deflecting reflector 40. While the deflecting reflector 40 has a deflecting reflector surface 41, the deflecting reflector 40J is a micro prism. The light from the light source 20 is reflected and deflected by the micro prism that is the deflecting reflector 40J.

Figure 17A:
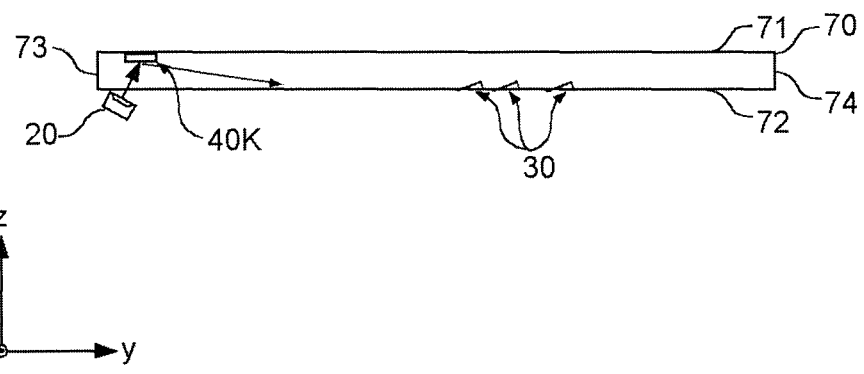
FIGS. 17(a)-17(b) schematically illustrate a partially enlarged portion of a display device 10K, which is another variation of the display device 10.
Figure 17B:
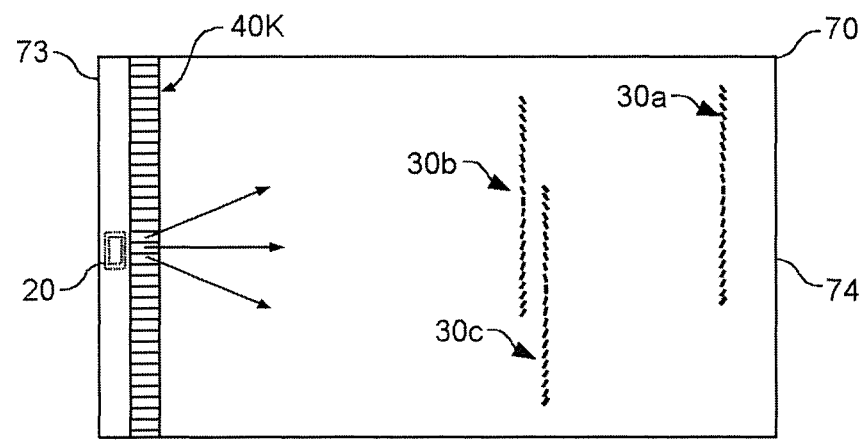

FIGS. 17(*a*)-17(*b*) schematically illustrate a partially enlarged portion of a display device 10K, which is a variation of the display device 10. FIG. 17(*a*) illustrates a cross-section in the y-z plane, and FIG. 17(*b*) illustrates a top plan view in the x-y plane. The display device 10K has a deflecting reflector 40K with a different shape than that of the deflecting reflector 40. The light from the light source 20 is incident on the rear surface 72 at an angle relative to the z-axis. The light source 20 causes light to enter the light guide plate 70 along a direction that is different from the direction perpendicular to the rear surface 72. Other than these structures, the display device 10K has substantially the same structure as that of the display device 10. The deflecting reflector 40K includes a plurality of reflective surfaces arranged along the x-axis direction. The plurality of reflective surfaces included in the deflecting reflector 40K reflect the light from the light source 20 so that the light spreads through a plane parallel to the emission surface 71.

Figure 18A:
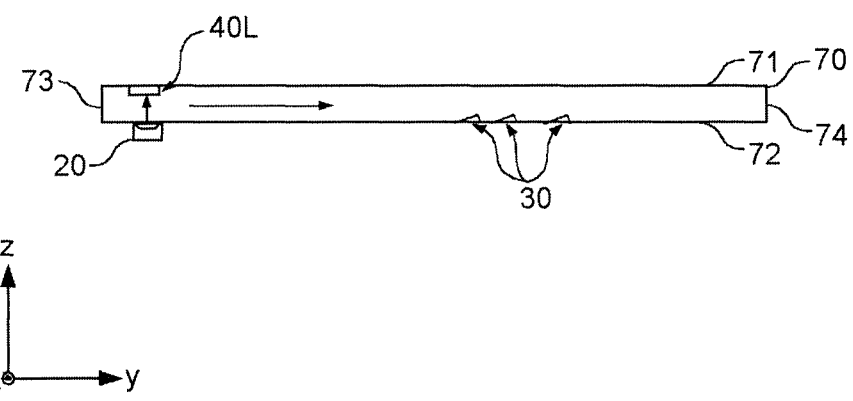
FIGS. 18(a)-18(b) schematically illustrate a partially enlarged portion of a display device 10L, which is another variation of the display device 10.
Figure 18B:
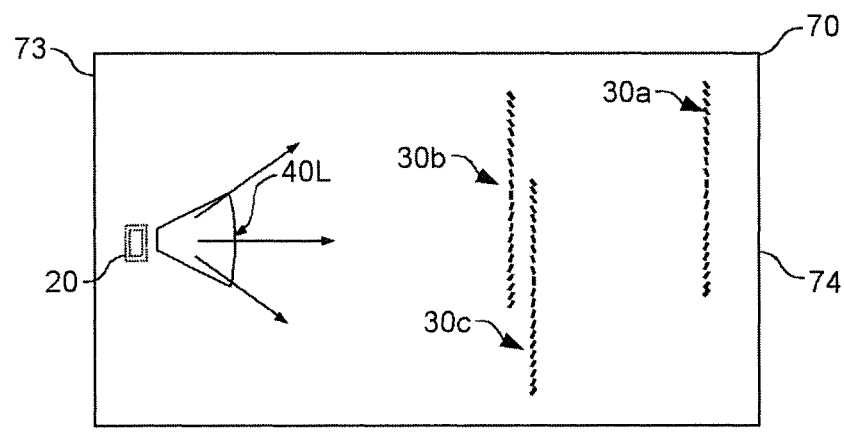

FIGS. 18(*a*)-18(*b*) schematically illustrate a partially enlarged portion of a display device 10L, which is a variation of the display device 10. FIG. 18(*a*) illustrates a cross-section in the y-z plane, and FIG. 18(*b*) illustrates a top plan view in the x-y plane. The display device 10L has a deflecting reflector 40L with a different shape from that of the deflecting reflector 40. Other than these structures, the display device 10L has substantially the same structure as that of the display device 10. The deflecting reflector 40L is provided on the emission surface 71 and reflects the light from the light source 20 so that the light spreads through a plane parallel to the emission surface 71.

Figure 19A:
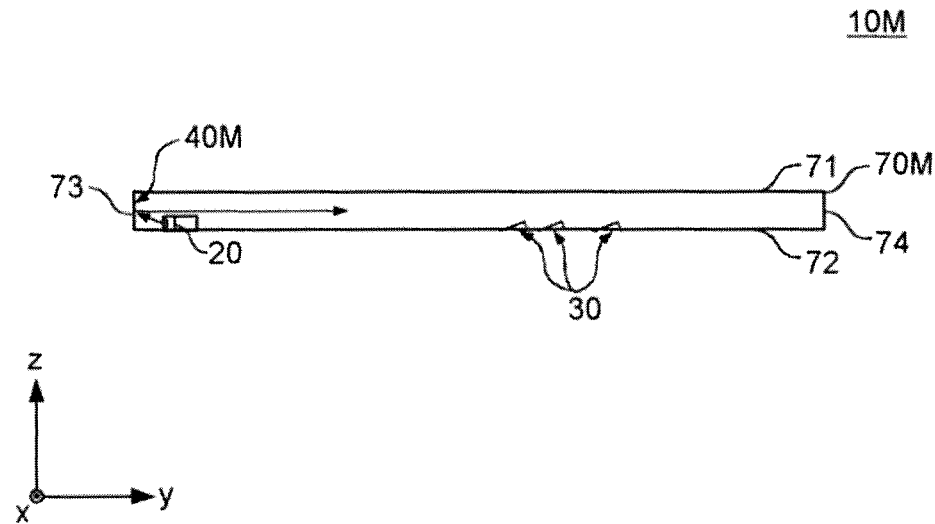
FIGS. 19(a)-19(b) schematically illustrate a partially enlarged portion of a display device 10M, which is another variation of the display device 10.
Figure 19B:
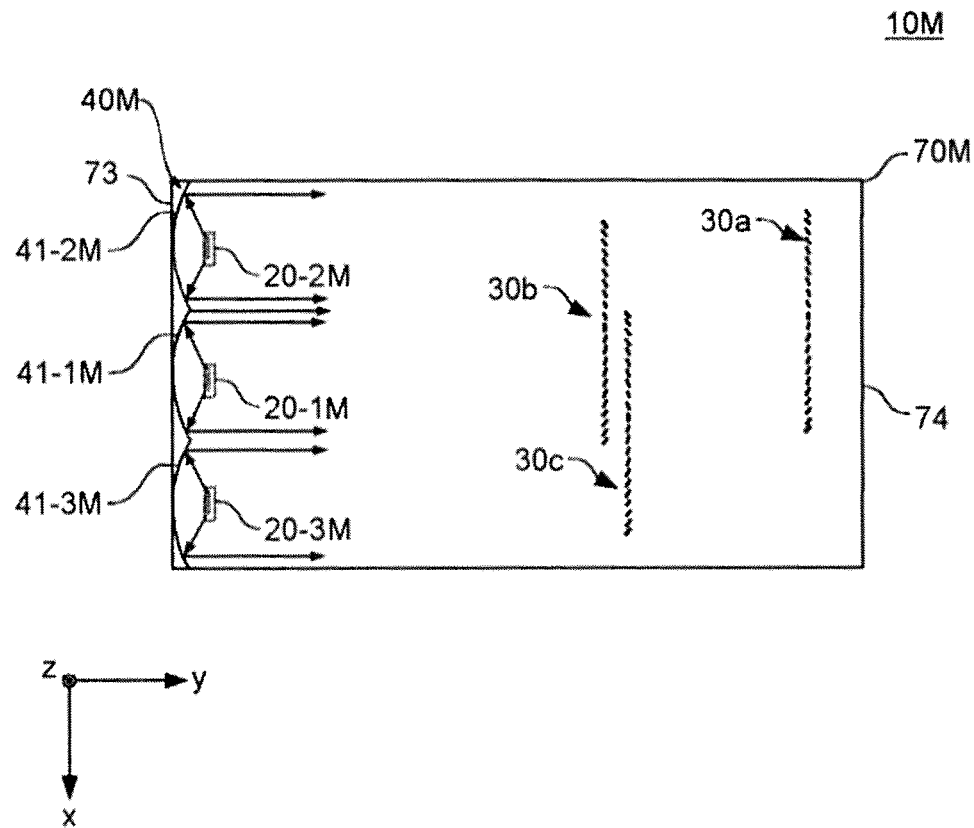

FIGS. 19(*a*)-19(*b*) schematically illustrate a partially enlarged portion of a display device 10M, which is a variation of the display device 10. FIG. 19(*a*) illustrates a cross-section in the y-z plane, and FIG. 19(*b*) illustrates a top plan view in the x-y plane. The display device 10M has a light source 20-1M, a light source 20-2M, and a light source 20-3M. Further, the light guide plate 70M includes a recess in the rear surface 72, and the light source 20-1M, the light source 20-2M, and the light source 20-3M are provided on the surface of the recess near the first edge 73. Further, the light guide plate 70M includes a deflecting reflector 40M on the first edge 73. Other than these structures, the display device 10M has substantially the same structure as that of the display device 10.

The light source 20-1M, the light source 20-2M, and the light source 20-3M are arranged side by side in a direction along a plane perpendicular to the light guide direction of the light guide plate 70M and parallel to the emission surface 71. The light source 20-1M, the light source 20-2M, and the light source 20-3M emit light inside the light guide plate 70M toward the first edge 73 of the light guide plate 70M.

The deflecting reflector 40M is provided on the first edge 73. The deflecting reflector 40M includes a deflecting reflector surface 41-1M, a deflecting reflector surface 41-2M, and a deflecting reflector surface 41-3M. The deflecting reflector surface 41-1M, the deflecting reflector surface 41-2M, and the deflecting reflector surface 41-3M correspond to the light source 20-1M, the light source 20-2M, and the light source 20-3M, and are arranged side by side in a direction along a plane perpendicular to the light guide direction of the light guide plate 70M and parallel to the emission surface 71. The deflecting reflector surface 41-1M, the deflecting reflector surface 41-2M, and the deflecting reflector surface 41-3M reflect the light from the light source 20-1M, the light source 20-2M, and the light source 20-3M, and deflect the light so that light that is substantially parallel advances toward the second edge 74.

Each of the deflecting reflector surface 41-1M, the deflecting reflector surface 41-2M, and the deflecting reflector surface 41-3M is composed of a mirror having, for example, a parabolic surface. According to one or more embodiments of the present invention, the light source 20-1M is provided on or near the focal point of the parabolic surface of the deflecting reflector surface 41-1M. Similarly, according to one or more embodiments of the present invention, the light source 20-2M is provided on or near the focal point of the parabolic surface of the deflecting reflector surface 41-2M and the light source 20-3M is provided on or near the focal point of the parabolic surface of the deflecting reflector surface 41-3M.

Figure 20A:
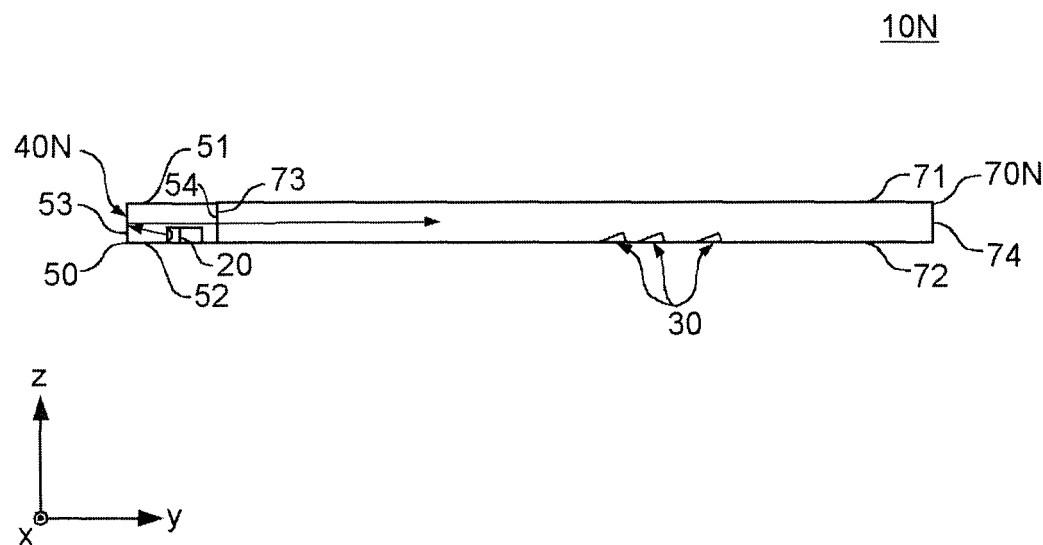
FIGS. 20(a)-20(b) schematically illustrate a partially enlarged portion of a display device 10N, which is a variation of the display device 10M.
Figure 20B:
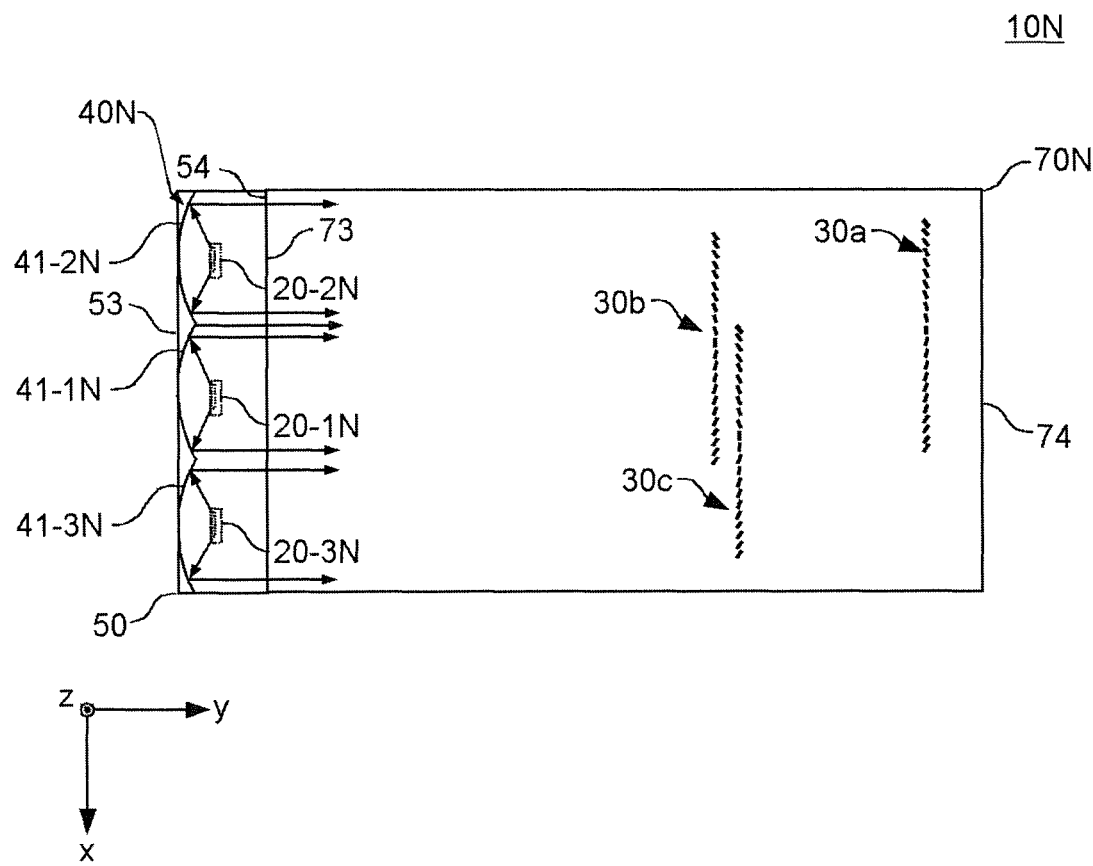

FIGS. 20(*a*)-20(*b*) schematically illustrate a partially enlarged portion of a display device 10N, which is a variation of the display device 10. FIG. 20(*a*) illustrates a cross-section in the y-z plane, and FIG. 20(*b*) illustrates a top plan view in the x-y plane. The display device 10N includes a deflecting part 50 having a deflecting reflector 40N. Further, the display device 10N includes a light source 20-1N, a light source 20-2N, and a light source 20-3N. Other than these structures, the display device 10N has substantially the same structure as that of the display device 10.

The deflecting part 50 is provided on the first edge 73. The deflecting part 50 includes an edge 54 facing the first edge 73 and an edge 53 opposite the edge 54. The deflecting part 50 includes an edge 51 substantially parallel to the emission surface 71 of the light guide plate 70N, and a rear surface 52 opposite the edge 51.

The display device 10N is configured such that the deflecting part 50 includes a deflection reflector 40N corresponding to the deflection reflector 40M in the display device 10M. The deflecting part 50 includes the deflection reflector 40N on the edge 53. Further, the deflecting part 50 includes a recess in the rear surface 52. The light source 20 is provided in the recess near the edge 53.

The light source 20-1N, the light source 20-2N, and the light source 20-3N are arranged side by side in a direction along a plane perpendicular to the light guide direction of the light guide plate 70N and parallel to the emission surface 71. The light source 20-1N, the light source 20-2N, and the light source 20-3N emit light inside the deflecting part 50 toward the edge 53 of the deflecting part 50, respectively.

The deflecting reflector 40N includes a deflecting reflector surface 41-1N, a deflecting reflector surface 41-2N, and a deflecting reflector surface 41-3N. The deflecting reflector surface 41-1N, the deflecting reflector surface 41-2N, and the deflecting reflector surface 41-3N correspond to the light source 20-1N, the light source 20-2N, and the light source 20-3N, and arranged side by side in a direction along a plane perpendicular to the light guide direction of the light guide plate 70N and parallel to the emission surface 71. The deflecting reflector surface 41-1N, the deflecting reflector surface 41-2N, and the deflecting reflector surface 41-3N reflect the light from the light source 20-1N, the light source 20-2N, and the light source 20-3N, and deflect the light so that substantially parallel light advances toward the second edge 74.

Each of the deflecting reflector surface 41-1N, the deflecting reflector surface 41-2N, and the deflecting reflector surface 41-3N is composed of a mirror having, for example, a parabolic surface. According to one or more embodiments of the present invention, the light source 20-1N is provided on or near the focal point of the parabolic surface of the deflecting reflector surface 41-1N. Similarly, according to one or more embodiments of the present invention, the light source 20-2N is provided on or near the focal point of the parabolic surface of the deflecting reflector surface 41-2N and the light source 20-3N is provided on or near the focal point of the parabolic surface of the deflecting reflector surface 41-3N.

The display device 10N has the light source 20 included in the deflecting part 50. Similarly to the display device 10M, the light source 20 may be provided on the light guide plate 70N as a variation of the display device 10N.

The deflecting reflectors above described are examples of an optical deflection surface that deflects light from the light source in the light guide direction of the light guide plate. A diffractive surface may be adopted as the optical deflection surface in addition to the reflective surface. An optical surface may deflect light from the light source using refraction in addition to reflection and diffraction. Furthermore, except for the display device 10M, the optical deflection surfaces are provided near the emission surface 71 in the display device 10 and the variations thereon. However, the optical deflection surface may be provided near the rear surface 72. For example, light from the light source 20 incident on the rear surface 72 of the light guide plate 70 may be diffracted or refracted by an optical deflection surface provided near the rear surface 72 so that the light is deflected in the light guide direction of the light guide plate 70. In this way, the optical deflection surface may be provided near the rear surface 72 as in the case of the light source 20.

Further, the light source 20 and the optical deflection surface may be positioned so that the light source 20 is provided near the emission surface 71 and the optical deflection surface is provided near the rear surface 72; except for the display device 10M, such a positional relationship is the opposite of the arrangements in the display device 10 and possible variations thereto. The light source 20 may be provided near the emission surface 71 and the optical deflection surface may also be provided near the emission surface 71. For example, the light from the light source 20 entering the light guide plate 70 through the emission surface 71 may be diffracted or refracted so that the light is deflected in the light guide direction of the light guide plate 70. As such, the optical deflection surface may be provided near the emission surface 71 on the same side carrying the light source 20.

Further, except for the display device 10M, the light source 20 and the light guide plate 70 may be positioned so that the light source 20 is provided on the light guide plate 70 in the display device 10 and the other variations thereto. However, the light source 20 may be provided independently of the light guide plate 70 as in the display device 10N. In this case, the optical deflection surface may be provided where the light source 20 is provided. Further, the above-described display device 10 and the variations thereon may exclude the light source 20.

Figure 21:
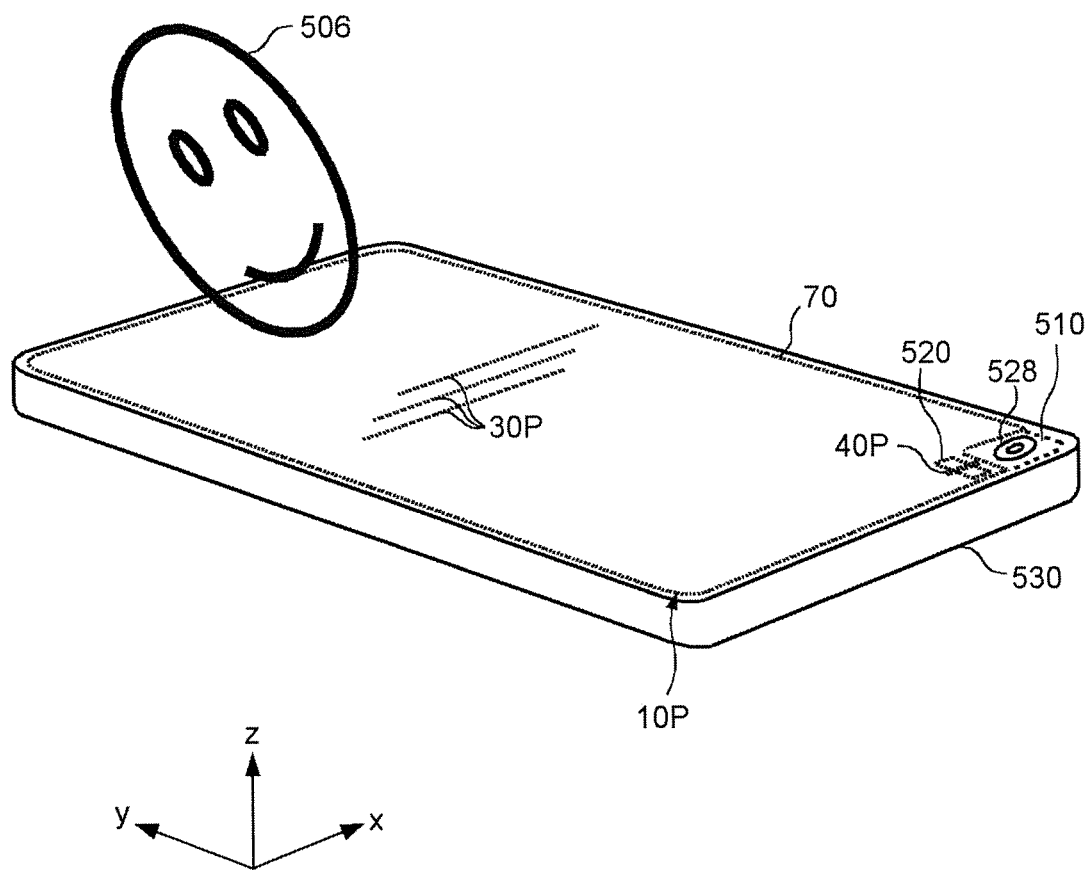
FIG. 21 is a perspective view schematically illustrating an example of an optical system 500 along with a three-dimensional image.

FIG. 21 is a perspective view schematically illustrating an example of an optical system 500 along with a three-dimensional image. FIG. 22 schematically illustrates the y-z cross-section of the optical system 500. The optical system 500 includes a display device 10P and a mobile terminal 510, and a terminal cover 530.

The display device 10P is a variation of a display device 10. The display device 10P includes a deflecting reflector 40P corresponding to the deflecting reflector 40. The terminal cover is made of a transparent material.

The mobile terminal 510 is an electronic device such as a smartphone. The mobile terminal 510 is capable of capturing images. The mobile terminal 510 includes a display 518, a light source 520, and a camera unit 528. The display 518 includes a touchscreen panel that accepts user operations. The light source 520 outputs light for illuminating a subject when imaging the subject using the camera unit 528. The light source 520 outputs light from a principal surface 512 opposite a principal surface 511 whereon the display 518 is provided.

The display device 10P is provided between the terminal cover 530 and the principal surface 512 of the mobile terminal 510. The emission surface 71 of the light guide plate 70 is substantially in contact with the terminal cover 30 and the rear surface 72 of the light guide plate 70 is substantially in contact with the principal surface 512 of the mobile terminal 510. The display device 10P has an outer shape substantially matching the outer shape of the mobile terminal 510. The display device 10P has an outer shape substantially the same as the outer shape of the principal surface 512 of the mobile terminal 510, and the outer shape of the display device 10P matches the outer shape of the principal surface 512 so that the display device 10P aligns with the principal surface 512. The emission surface 71 of the light guide plate 70 is covered with the bottom surface of a recess in the tell final cover 530 with the display device 10P aligned with the principal surface 512, so that the display device 10P is secured to the terminal cover 530. The deflecting reflector 40P is provided facing the light source 520 when the display device 10P is aligned with the principal surface 512.

The reflecting reflector 40P in the optical system 500 occupies a portion of the emission window of the light source 520 when light is projected onto the x-y plane. When the light source 520 emits light, a portion of the light from the light source 520 is incident on the deflecting reflector 40P; the light reflects from the deflecting reflector 40P and propagates through the light guide plate 70. A portion of the light from the light source 520 that is not incident on the deflecting reflector 40P is emitted outside the optical system 500 through the light guide plate 70 and the terminal cover 530.

The light focusing portion 30P is provided on the rear surface 72 of the light guide plate 70 to form a three-dimensional image 506. The light propagates through the light guide plate 70 and the light focusing portion 30P deflects part of the light. The deflected light is emitted outside the optical system 500 through the emission surface 71 and the terminal cover 530 to thus form the image 506 in a space outside the optical system 500. The optical system 500 is configured such that the light source 520 emits light to form the image 506 in a space outside the optical system 500, for example, when capturing an image of a subject using the mobile terminal 510.

The mobile terminal 510 incorporates software that causes the light source 520 to emit light when predetermined light emitting conditions are satisfied. When the predetermined light emitting conditions are satisfied, the mobile terminal 510 activates the light source 520 in accordance with control based on software. For example, the mobile terminal 510 displays a button for accepting an instruction to form the image 506 before capturing an image and activates the light source 20 when the button is touched. Thereafter, when a button for accepting an imaging instruction is touched, the mobile terminal 510 activates the light source 20 when the camera unit 528 captures an image in accordance with the brightness outside the optical system 500, predetermined conditions, and the like.

Figure 23A:
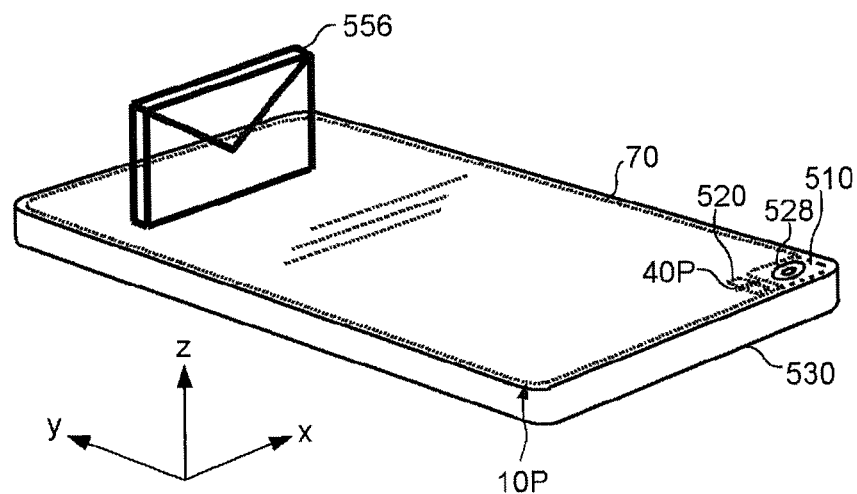
FIGS. 23(a)-23(c) illustrate another example of the three-dimensional image formed by a display device 10P.
Figure 23B:
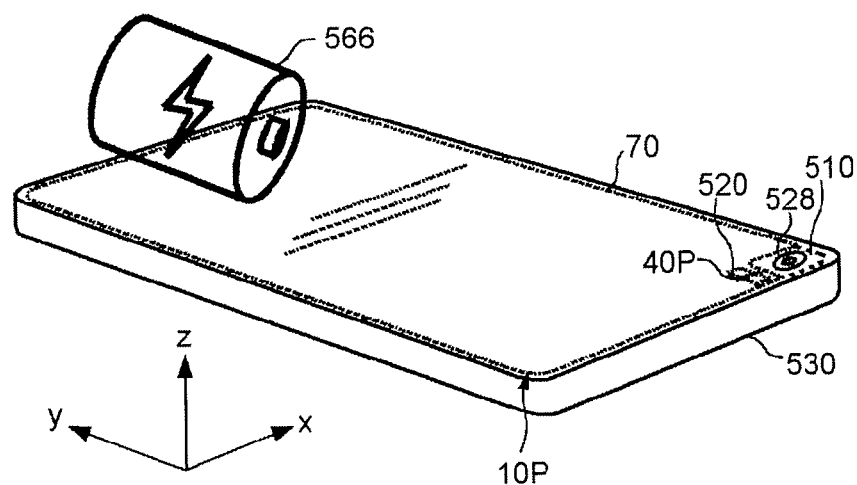
Figure 23C:
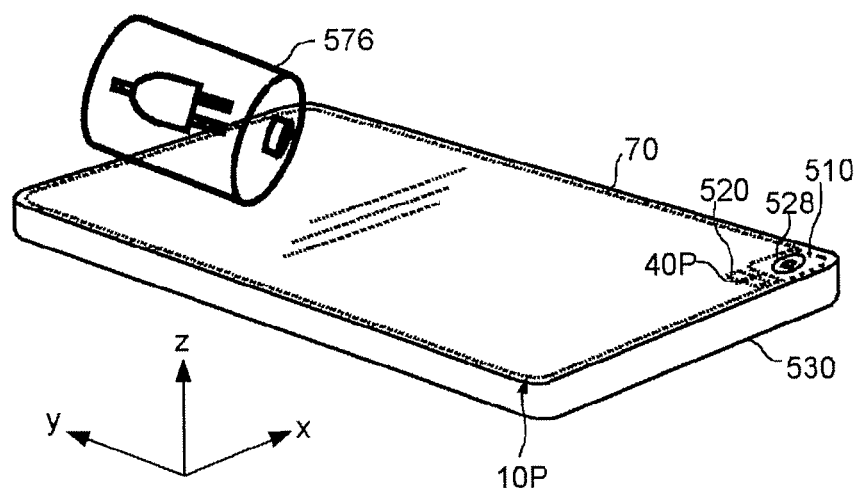

FIGS. 23(a)-23(c) illustrate another example of the three-dimensional image formed by a display device 10P. FIG. 23(a) illustrates a case where an image 556 providing notification of a new email is formed using light from a light focusing portion 30. In this case, the light emitting condition of the light source 20 is established using software so that the light source 520 is activated when the mobile terminal 510 receives an email. FIG. 23(b) illustrates a case where an image 566 providing notification that the mobile terminal 510 is being charged is formed using light from a light focusing portion 30. In this case, the light emitting condition of the light source 20 is established using software so that the light source 520 is activated when the battery in the mobile terminal 510 is being charged. FIG. 23(c) illustrates a case where an image 576 providing notification that the mobile terminal 510 is charged is formed using light from a light focusing portion 30. In this case, the light emitting condition of the light source 20 is established using software so that the light source 520 is activated when the battery in the mobile terminal 510 is fully charged.

The display device 10P may be provided with a plurality of optical deflector groups that emits light forming a plurality of images. For example, the display device 10P may be provided with a first optical deflector group forming the image 556, a second optical deflector group forming the image 566, and a third optical deflector group forming the image 576. The first optical deflector group may selectively deflect the light guided by the light guide plate 70 that is in a first wavelength range (for example, blue wavelength range); the second optical deflector group may selectively deflect light guided by the light guide plate 70 that is in a second wavelength range (for example, red wavelength range); and the third optical deflector group may selectively deflect light guided by the light guide plate 70 that is in a third wavelength range (for example, green wavelength range). For example, the reflective surface of each optical deflector group may be provided with dichroic mirrors that each selectively reflects light of a corresponding wavelength range. Software may be used to establish that the light source 520 emits light with in the first wavelength range when a first predetermined light-emitting condition is satisfied, such as the arrival of email; the light source 520 emits light in the second wavelength range when a second predetermined light-emitting condition is satisfied, such as when charging the battery; and the light source 520 emits light in the third wavelength range when a third predetermined light-emitting condition is satisfied, such as when the battery is charged.

The display device 10P may be provided integrally with the terminal cover 530. As least either the deflecting reflector 40P or the light focusing portion 30P may be formed in the terminal cover 530. The display device 10P may be provided on the principal surface 511 of the mobile terminal 510. The deflecting reflector 40P may be provided at a position facing a part of the region of the display 518 so that the emission light from the part of the region of the display 518 may be used as incidence light bound for the display device 10P.

Embodiments of the present invention are described above, but it should be noted that the technical scope of the present invention is not limited to the above-described embodiments. It is clear to a person skilled in the art that various modifications and alterations to the above-described embodiments are possible. It is the scope of the claims that makes it clear whether such kind of modifications or improvements to the embodiments is within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed any order as desired. The terms "first", "next", and the like are used for convenience when describing operational flows within the scope of the claims, the specification, and in the drawings, and does not mean that execution in this order is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

6 Image
10 Display device
20 Light source
21 Emission window
30 Light focusing portion
70 Light guide plate
71 Emission surface
72 Rear surface
40 Deflecting reflector
41 Deflecting reflector surface
50 Deflecting part
51 Edge
52 Rear surface
53, 54 Edge
73 First edge
74 Second edge 75 Third edge
76 Fourth edge
100 Display device
110 Auxiliary reflector
111 Surface
114 Projection
120 Reflective film
130 Body
140 Reflective surface
190 Line
200 Emission window
400 Deflecting reflector
500 Optical system
506, 556, 566, 576 Image
510 Mobile terminal
511, 512 Principal surface
518 Display
520 Light source
528 Camera unit
530 Terminal cover
FIG. 4
Coupling beam quantity (lm)
Forward angle
Coupling beam quantity (lm)
Groove depth

The invention claimed is:

1. An optical device comprises:
   a light guide plate that guides light in a light guide direction parallel to an emission surface thereof;
   an optical deflection surface that deflects light entering the light guide plate from a light source that faces a flat plane parallel to at least the emission surface or the surface opposite the emission surface, so that the light travels along the light guide direction of the light guide plate; and
   a plurality of light focusing portions,
   wherein the optical deflection surface is disposed such that an incident light beam perpendicular to the emission surface is deflected to travel in a direction parallel to the emission surface,
   wherein each of the light focusing portions includes an optical surface whereon the light deflected by the optical deflection surface and guided by the light guide plate is incident, and which causes the emission surface to output emission light that converges substantially on a convergence point or convergence line in a space, or that radiates substantially from a convergence point or convergence line in a space,
   wherein each of the light focusing portions is formed along a predetermined line in a plane parallel to the emission surface,
   wherein the convergence points or convergence lines are mutually different among the plurality of light focusing portions,
   wherein a group of a plurality of said convergence points or said convergence lines creates an image in a space, and
   wherein the optical deflection surface comprises a plurality of reflective surfaces oriented to allow the light entering the light guide plate from the light source to spread in a plane parallel to the light guide direction of the light guide plate.

2. The optical device according to claim 1,
   wherein the light source is provided facing at least the emission surface of the light guide plate or the surface opposite the emission surface, and
   wherein light enters the light guide plate from at least the one surface carrying the light source.

3. The optical device according to claim 2,
   wherein the optical deflection surface includes a deflecting reflector surface that is provided on the surface opposite the surface carrying the light source, and
   wherein the deflecting reflector surface reflects the light entering the light guide plate from the light source and deflects the light so that the light travels along the light guide direction of the light guide plate.

4. The optical device according to claim 3, wherein the length of the deflecting reflector surface along a direction substantially perpendicular to the light guide direction of the light guide plate is shorter than the length of an emission window wherefrom light from the light source is emitted toward the light guide plate.

5. The optical device according to claim 4, wherein the divergence angle of the light that is deflected by the deflecting reflector surface and guided by the light guide plate is 5° or less in a plane parallel to the emission surface.

6. The optical device according to claim 5, wherein a formula $W \leq L/10$ is satisfied, where L represents the distance between the incidence edge of the light guide plate and the center of a region where a light focusing portion is formed; and W represents the width of the deflecting reflector surface parallel to the emission surface along a direction substantially perpendicular to the light guide direction of the light guide plate.

7. The optical device according to claim 5, further comprising:
   a reflective film provided on the deflecting reflector surface.

8. The optical device according to claim 4, wherein a formula $W \leq L/10$ is satisfied, where L represents the distance between the incidence edge of the light guide plate and the center of a region where a light focusing portion is formed; and W represents the width of the deflecting reflector surface parallel to the emission surface along a direction substantially perpendicular to the light guide direction of the light guide plate.

9. The optical device according to claim 8, further comprising:
   a reflective film provided on the deflecting reflector surface.

10. The optical device according to claim 4, further comprising:
    a reflective film provided on the deflecting reflector surface.

11. The optical device according to claim 3, further comprising:
    a reflective film provided on the deflecting reflector surface.

12. The optical device according to claim 3, further comprising:
    an auxiliary reflector having a surface provided with a reflective film and attached to the light guide plate so that the reflective film comes in contact with the deflecting reflector surface.

13. The optical device according to claim 3,
    wherein a plurality of additional deflecting reflector surfaces is provided along the light guide direction of the light guide plate, and
    wherein each of the plurality of said additional deflecting reflector surfaces is different from other additional deflecting reflector surfaces in at least the length along a direction perpendicular to the emission surface or the angle relative to a plane parallel to the emission surface in the plane perpendicular to the emission surface and following the light guide direction of the light guide plate.

14. The optical device according to claim 3,
wherein the deflecting reflector surface includes a first deflecting reflector surface and a second deflecting reflector surface continuing from the first deflecting reflector surface along the light guide direction of the light guide plate, and
wherein the angle of the first deflecting reflector surface relative to a plane parallel to the emission surface is different from the angle of the second deflecting reflector surface relative to the plane parallel to the emission surface in the plane perpendicular to the emission surface and following the light guide direction of the light guide plate.

15. The optical device according to claim 14,
wherein the first deflecting reflector surface and the second deflecting reflector surface form a part of the surface of a recess formed in the surface opposite the surface carrying the light source in the light guide plate, and
wherein the inclination of the second deflecting reflector surface relative to the plane parallel to the emission surface is smaller than the inclination of the first deflecting reflector surface relative to the plane parallel to the emission surface in the plane perpendicular to the emission surface and following the light guide direction of the light guide plate.

16. The optical device according to claim 1, further comprising the light source.

* * * * *